United States Patent [19]

Haartsen

[11] Patent Number: 5,491,837
[45] Date of Patent: Feb. 13, 1996

[54] METHOD AND SYSTEM FOR CHANNEL ALLOCATION USING POWER CONTROL AND MOBILE-ASSISTED HANDOVER MEASUREMENTS

[75] Inventor: Jacobus C. Haartsen, Staffanstorp, Sweden

[73] Assignee: Ericsson Inc., Research Triangle Park, N.C.

[21] Appl. No.: 207,032

[22] Filed: Mar. 7, 1994

[51] Int. Cl.[6] .................................................. H04B 15/00
[52] U.S. Cl. ......................... 455/62; 455/33.1; 455/34.2; 455/54.1; 455/56.1; 370/95.1; 370/95.3; 379/59
[58] Field of Search ............................ 455/33.1, 34.1, 455/34.2, 53.1, 54.1, 54.2, 56.1, 62, 67.1, 69, 70, 33.4, 38.3; 370/95.3, 95.1; 379/58, 59, 60

[56] References Cited

U.S. PATENT DOCUMENTS

| | | | |
|---|---|---|---|
| 4,485,486 | 11/1984 | Webb et al. | 455/33.1 |
| 4,866,710 | 9/1989 | Schaeffer | 370/95.1 |
| 5,038,399 | 8/1991 | Bruckert | 455/33.1 |
| 5,056,109 | 10/1991 | Gilhousen et al. | 455/54.1 |
| 5,109,528 | 4/1992 | Eddenfeldt | 455/33.2 |
| 5,123,110 | 6/1992 | Grube | 455/33.1 |
| 5,157,709 | 10/1992 | Ohteru | 379/58 |
| 5,175,867 | 12/1992 | Wejke et al. | 455/53.1 |
| 5,185,739 | 2/1993 | Spear | 370/95.3 |
| 5,203,012 | 4/1993 | Patsiokas et al. | 455/34.1 |
| 5,218,630 | 6/1993 | Patsiokas et al. | 379/59 |
| 5,230,082 | 7/1993 | Ghisler et al. | 455/33.2 |
| 5,247,699 | 9/1993 | Hartman | 455/33.3 |

FOREIGN PATENT DOCUMENTS

| | | |
|---|---|---|
| 0411878 | 2/1991 | European Pat. Off. . |
| 0458158 | 11/1991 | European Pat. Off. . |
| 0578197 | 7/1993 | European Pat. Off. . |
| WO9308655 | 4/1993 | WIPO . |

OTHER PUBLICATIONS

"Performance of Dynamic Channel Assignment Techniques in a Cellular Environment", Iain Brodie, BT Laboratories Martelsham Heath, Conference Proceedings, 25 Jun. 1992-26 Jun. 1992, pp. 340-343.

M. Almgren, H. Andersson, and K. Wallstedt, "*Capacity Enhancement in a TDMA System*", submitted for Symp. of Veh. Tech., VTC'93, 1993.

H. Anderson, H. Eriksson, A. Fallgren and M. Madfors, "*Adaptive Channel Allocation in a TIA IS-54 System*", 42ndf IEEE Veh. Techn. Conf., Denver, 1992, pp. 778-781.

R. Beck, H. Panzer, "*Strategies for Handover and Dynamic Channel Allocation in Microcellular Mobile Radio Systems*", 39th IEEE Vehicular Technology Conf., San Francisco, May 1989, pp. 668-672.

R. C. Bernhardt, "*Time-slot Management in Frequency Reuse Digital Portable Radio Systems*", Proc. of Veh. Tech. Conf. 1990, pp. 282-286.

R. C. Bernhardt, "*Call Performance in a Frequency Reuse Digital Portable Radio System*", IEEE Trans. on Veh. Tech., vol. 40, Nov. 1991, pp. 777-785.

(List continued on next page.)

Primary Examiner—Reinhard J. Eisenzopf
Assistant Examiner—Doris To
Attorney, Agent, or Firm—Burns, Doane, Swecker & Mathis

[57] ABSTRACT

A method and system for the adaptive allocation of channels within a radio communication system, specifically a cellular network, is presented. The allocation method takes advantage of measurements made by the mobile radiotelephone and allocates channels based on the carrier to interference ratio. Using adaptive power control, consideration is given to maintaining an acceptable carrier to interference ratio while at the same time minimizing transmit power. Exemplary embodiments consider independent allocation of the uplink and downlink as well as independent determination of the uplink and downlink power levels. Other exemplary embodiments also give consideration to an efficient method for slot allocation in a TDMA communication system.

32 Claims, 10 Drawing Sheets

OTHER PUBLICATIONS

J. C. -I. Chuang, "*Autonomous Adaptive Frequency Assignment for TDMA Portable Radio Systems*", IEEE Trans. on Veh. Tech., vol. 40, Aug. 1991, pp. 627–635.

J. C. Chuang, "*Performance Issues and Algorithms for Dynamic Channel Assignment*", Proc. IEEE Globecom'92, Orlando 1992, pp. 1419–1424.

J. C. -I. Chuang, "*Autonomous Frequency Assignment and Access for TDMA Personal Portable Radio Communications*", 41st EIII Vehicular Technology Conf., St. Louis, May 1991, pp. 699–703.

D. C. Cox, "*Increasing Channel Occupancy in Large–Scale Mobile Radio Systems: Dynamic Channel Reassignment*", IEEE Trans. on Comm., vol. 21, No. 1973, pp. 1302–1306.

M. Duque–Anton, D. Kunz, and B. Rueber, "*Channel Assignment for Cellular Radio Using Simulated Annealing*", IEEE Trans. on Veh. Tech., vol. 42, Feb. 1993, pp. 14–21.

H. Eriksson, "*Capacity Improvement by Adaptive Channel Allocation*", IEEE Global Telecomm. Conf. (Globecom), Nov. 1988, pp. 1355–1359.

H. Eriksson and R. Bownds, "*Performance of Dynamic Channel Allocation in the DECT System*", 41st IEEE Vehicular Technology Conf., St. Louis, May 1991.

D. Everitt, and D. Manfield, "*Performance Analysis of Cellular Mobile Communication Systems with Dynamic Channel Assignment*", IEEE J. on Sel. Areas in Comm., vol. 7, Oct., 1989, pp. 1172–1180.

G. Falciasecca, M. Frullone, G. Riva, A. M. Serra, "*On the Impact of Traffic Burst on Performances of High Capacity Cellular Systems*", Proc. of Veh. Tech. Conf. 1990, pp. 646–651.

M. Frodigh, "*Reuse–partitioning Combined with Traffic Adaptive Channel Assignment for Highway Microcellular Radio Systems*", Proc. IEEE Globecom'92, Atlanta 1992, pp. 1414–1418.

A. Gamst, "*Some Lower Bounds for a Class of Frequency Assignment Problems*", IEEE Trans. on Veh. Tech., vol. 35, Feb. 1986, pp. 8–14.

T. Kanai, "*Autonomous Reuse Partitioning in Cellular Systems*", 42nd IEEE Veh. Tech. Conf., Denver, May 1992, pp. 782–785.

D. Kunz, "*Practical Channel Assignment Using Neural Networks*", VTC'90, 1990, pp. 652–655.

R. W. Nettleton, G. R. Schloemer, "*A High Capacity Assignment Method for Cellular Mobile Telephone Systems*", Proc. of Veh. Tech. Conf. 1989, San Francisco, CA, May 1–3, pp. 395–367.

R. W. Nettleton, "*Traffic Statistics in a Self–Organizing Cellular Telephone System*", Proc. of Veh. Tech. Conf. 1990, pp. 305–310.

S. H. Oh, D. W. Tcha, "*Prioritized Channel Assignment in a Cellular Radio Network*", IEEE Trnas. on Comm., vol. 40, Nov. 1992, pp. 1259–1269.

S. Onoe, and S. Yasuda, "*Flexible Re–Use for Dynamic Channel Assignment in Mobile Radio Systems*", Proc. IEEE ICC'89, Jun. 1989, pp. 472–476.

H. Panzer, R. Beck, "*Adaptive Resource Allocation in Metropolitan Area Cellular Mobile Radio Systems*", Proc. of Veh. Tech. Conff. 1990, pp. 638–645.

G. Riva, "*Performance Analysis of an Improved Dynamic Channel Allocation Scheme for Cellular Mobile Radio Systems*", 42nd IEEE Veh. Techn. Conf., Denver, 1992, pp. 794–797.

A. N. Rosenberg, "*Stimulation of Power Control and Voice–Channel Selection in Cellular Systems*", Proc. IEEE VTC'85, 1985, pp. 12–15.

K. Sallberg, B. Stavenow, B. Eklundh, "*hybrid Channel Assignment and Reuse Partitioning in a Cellular Mobile Telephone System*", Proc. IEEE VTC'87, 1987, pp. 405–411.

L. P. Shu, J. W. Chen, "*Dynamic Grouping Algorithm for Cellular Communications Systems*", Proc. of Veh. Tech. Conf. 1991, pp. 689–692.

K. N. Sivarajan, R. J. McEliece, and J. W. Ketchum, "*Channel Assignment in Cellular Radio*", Proc. of Veh. Tech. Conf. 1989, pp. 846–850.

K. N. Sivarajan, R. J. McEliece, and J. W. Ketchum, "*Dynamic Channel Assignment in Cellular Radio*", Proc. of Veh. Tech. Conf. 1990, pp. 631–637.

J. Tajima, "*A Stragety for Flexible Channel Assignment in Mobile Communication Systems*", IEEE Trans. on Veh. Tech., vol. 37, May 1988, pp. 92–103.

R. A. Valenzuela, "*Dynamic Resource Allocation in Line–of Sight Microcells*", IEEE Proc. GLOBECOM'92, Orlando 1991, pp. 11425–11430.

S. Yasuda, and S. Onoe, "*Autonomous Channel Assignment Control for Flexible Reuse in Mobile Radio Systems*", Proc. of 42nd Veh. Tech. Conf., May 10–13, 1992, Denver Co., pp. 789–801.

J. Zander, "*Distributed Cochannel Interference Control in Cellular Radio Systems*", IEEE Trans. on Veh. Techn., vol. 41, Aug. 1992, pp. 305–311.

J. Zander and M. Frodigh, "*Capacity Allocation and Channel Assignment in Cellular Radio Systems Using Reuse Partitioning*", Electr. Lett., vol. 28, Feb. 1992, pp. 438–440.

Fig. 1

| SYSTEM | BANDWIDTH (MHz) | NUMBER OF CHANNELS | BOUNDARY CHANNEL NUMBER | TRANSMITTER CENTER FREQUENCY (MHz) | |
|---|---|---|---|---|---|
| | | | | MOBILE | BASE |
| NOT USED | | 1 | | (824.010) | (869.010) |
| A* | 1 | 33 | 991<br>1023 | 824.040<br>825.000 | 869.040<br>870.000 |
| A | 10 | 333 | 1<br>333 | 825.030<br>834.990 | 870.030<br>879.990 |
| B | 10 | 333 | 334<br>666 | 835.020<br>844.980 | 880.020<br>889.980 |
| A' | 1.5 | 50 | 667<br>716 | 845.010<br>846.480 | 890.010<br>891.480 |
| B' | 1.5 | 83 | 717<br>799 | 846.510<br>848.970 | 891.510<br>893.970 |

| TRANSMITTER | CHANNEL NUMBER | CENTER FREQUENCY (MHz) |
|---|---|---|
| MOBILE | $1 \leq N \leq 799$<br>$990 \leq N \leq 1023$ | $0.030N + 825.000$<br>$0.030(N-1023) + 825.000$ |
| BASE | $1 \leq N \leq 799$<br>$990 \leq N \leq 1023$ | $0.030N + 870.000$<br>$0.030(N-1023) + 870.000$ |

METHOD AND SYSTEM FOR CHANNEL ALLOCATION USING POWER CONTROL AND MOBILE-ASSISTED HANDOVER MEASUREMENTS

BACKGROUND

The present invention relates in general to base radio-communication systems and, in particular, to channel allocation combined with power control in a mobile radio communication system.

The concept of frequency reuse is at the heart of cellular technology. In the conventional sense, frequency reuse is a technique whereby groups of frequencies are allocated for use in regions of limited geographic coverage known as cells. Cells containing equivalent groups of frequencies are geographically separated to allow callers in different cells to simultaneously use the same frequency without interfering with each other. By so doing many thousands of subscribers may be served by a system of only several hundred frequencies. The design and operation of such a system is described in an article entitled Advanced Mobile Phone Service by Blecher, IEEE Transactions on Vehicular Technology, Vol. VT29, No. 2, May, 1980, pp. 238–244. Known commonly as the AMPS system, this system had allocated to it by the FCC a block of the UHF frequency spectrum further subdivided into pairs of narrow frequency bands called channels. Pairing results from the frequency duplex arrangement wherein the transmit and receive frequencies are offset by 45 MHz. At present there are 832, 30 kHz wide, channels allocated to cellular mobile communications in the United States. A table of the frequencies dedicated to mobile communications in the U.S. is shown in FIG. 1. It is worth noting at this point that of the 832 available channels, there are 21 control channels dedicated each to the A-carrier and the B-carrier. These 42 control channels provide system information and cannot be used for voice traffic. The remaining 790 channels, known as voice or traffic channels, carry the burden of voice communication and are equally divided between the A-carrier and the B-carrier. A particular user can access at least half of the available channels, or 395. With regard to TDMA systems, such as specified by the IS-54B standard, these channels are further divided into 3 time slots. In this instance, a given user can access 3×395, or 1185, "channels".

Link quality is the benchmark of any radio communication system. To provide high quality voice communication the desired signal in a cellular system must maintain a minimum signal strength above all other interference. The ratio of the desired signal to the interference is known as C/I. Aside from noise, which is omnipresent, there are fundamentally two other types of interference with which a designer must contend. The first of these is interference arising from users simultaneously operating on the same channel. This is known as co-channel interference. The second source of interference is from users operating on adjacent channels. This is known as adjacent-channel interference. Adjacent channel interference is controlled by selecting the frequencies in a given cell to be separated by large frequency increments, e.g., 200 kHz, and by using sharp cutoff in the channel filters in order to obtain a high adjacent-channel suppression. Co-channel interference is reduced by use of a frequency reuse pattern which geographically separates cells with the same frequency group. An example of an ideal seven cell frequency reuse pattern is shown in FIG. 2(a).

Frequency planning is the process by which individual channels are assigned to cells within the network. Currently, most frequency planning is done a priori; that is a fixed frequency plan is "hard-wired" in place by each cellular system operator. This is known as fixed channel allocation, or FCA. However, as interference and traffic load are time varying, FCA is not optimal. As shown in FIG. 2(b), highways which bisect cellular boundaries may have significantly differing traffic patterns depending on location and time of day. Some roads may have significant automobile traffic in the morning and very little in the afternoon. As a result, most fixed frequency plans are not very efficient; many channels in a fixed frequency plan will have a much better link quality than is necessary to achieve high quality voice communication while many others in the same system will suffer from poor link quality which might force them to be dropped or blocked. A capacity increase could be obtained by some form of channel allocation where all of the links have equal quality. Because of the time varying nature of the interference, an adaptive scheme must be used.

Adaptive channel allocation, or ACA, is a method of dynamically allocating frequencies throughout a cellular system to maximize system capacity. Under an ACA scheme, more frequencies would be allocated to busy cells from more lightly loaded cells. In addition, the channels can be allocated such that all links have satisfactory quality.

The concept of ACA is well-known to those skilled in the art. Many publications have illustrated the potential for ACA yet do not discuss specific strategies. For example, "Capacity Improvement by Adaptive Channel Allocation", by Håkan Eriksson, IEEE Global Telecomm. Conf., Nov. 28–Dec. 1, 1988, pp. 1355–1359, illustrates the capacity gains associated with a cellular radio system where all of the channels are a common resource shared by all base stations. In the above-referenced report, the mobile measures the signal quality of the downlink and channels are assigned on the basis of selecting the channel with the highest C/I level.

Another approach is described by G. Riva, "Performance Analysis of an Improved Dynamic Channel Allocation Scheme for Cellular Mobile Radio Systems", 42nd IEEE Veh. Tech. Conf., Denver, 1992, pp. 794–797 where the channel is selected based on achieving a quality close to or little better than a required C/I threshold. Furuya Y. et al., "Channel Segregation, A Distributed Adaptive Channel Allocation Scheme for Mobile Communications Systems", Second Nordic Seminar on Digital Land Mobile Radio Communication, Stockholm, Oct. 14–16, 1986, pp. 311–315 describe an ACA system wherein the recent history of link quality is considered as a factor in allocation decisions. In addition several hybrid systems have been presented where ACA is applied to a small block of frequencies on top of an FCA scheme. Such an example is presented in Sallberg, K., et al., "Hybrid channel assignment and reuse partitioning in a cellular mobile telephone system", Proc. IEEE VTC '87, 1987, pp. 405–411.

A common denominator for all of these ACA systems is that they allocate a channel out of the set of channels which fulfills some predetermined quality criteria. The difference in each is how the channel is chosen out of the set. Apart from increases in system capacity, adaptive channel allocation obviates the need for system planning. Planning is instead performed by the system itself; this is particularly attractive when system changes are implemented or new base stations are added.

Adaptive power control, or APC, is also a known art in cellular systems. See, for example, U.S. Pat. No. 4,485,486 to Webb et al. With APC, the power of the transmitter is varied according to the needs in the receiver. In general, there are two types of adaptive power control schemes: the C-based and the C/I-based. In the C-based scheme, the signal strength level at the receive side is maintained at a predefined level. As soon as the (average) received signal strength deviates from this level, the transmitter is ordered by the receiver to increase or decrease its transmit power. C-based APC only responds to changes in the path loss whereas C/I-based APC tries to maintain a predefined C/I level at the receiver. In addition to changes in the path losses, changes in the interference condition also result in the transmit power being adjusted.

The conventional allocation algorithms described above base their decisions on the knowledge of which channels are used by which base stations and then attempt to optimize the quality in each link. However, they do not take advantage of the possibilities offered by adaptive power control in the mobiles and base transmitters.

In a TDMA environment, the allocation decision includes more than just a selection of the base and channel combination. Since TDMA channels are broken up into time slots, the allocation decision should also take this into account. U.S. Pat. No. 4,866,710 to Schaeffer, for example, describes a method of allocating frequency and timeslots to mobile stations such that all the timeslots on a given frequency are filled before allocating timeslots on another frequency. Although seemingly efficient, this scheme does not consider the contributions to interference and does not consider the possibility of adaptive power control.

SUMMARY

It is therefore an object of the present invention to provide a method for dynamically allocating channels in a communication system which maximizes system capacity while minimizing the transmitted power of the mobile radiotelephones. It is a further object of the present invention to take advantage of measurements made by the mobile radiotelephones in determining link quality. It is yet another object of the present invention to enable battery operated radiotelephones to enjoy extended battery life by reducing the transmitted power.

The control scheme presented herein adapts to the current traffic and interference situation in a communication environment in order to optimize the quality of each link and maximize the overall system capacity. The status of the current traffic and interference condition is derived from measurements taken both by the mobile station and the base station. The channel allocations are periodically updated to ensure that, on average, the least amount of transmit power is used on the channels. Once a channel has been allocated, the adaptive power control scheme tries to maintain a satisfactory link quality with the minimum amount of radiated power. Since the adaptive power control and the adaptive channel allocation form one integrated process, the term adaptive channel allocation and power control, or ACAPC, is hereinafter adopted to describe the present invention. The present invention is not restricted to a particular type of access scheme and can therefore be applied equally, for example, to FDMA, TDMA, CDMA or hybrid systems.

In exemplary embodiments of the present invention, systems and methods allocate a channel that minimizes the average transmit powers. During updates, which are periodically performed, it is checked whether the average transmit power was indeed low, or that another channel can be found on which the transmit power can be even lower. Between channel updates, the APC tries to maintain the required C/I level in the receiver. The scheme ensures minimizing the transmit power which not only reduces interference to other channels, but also serves the laudable goal of extending the battery life of handheld mobile radiotelephones.

BRIEF DESCRIPTION OF THE DRAWINGS

These and other objects, features and advantages of the present invention will be readily apparent to one skilled in the art from the following written description, read in conjunction with the drawings, in which:

FIG. 1 is an illustration of the allocated frequency spectrum as per the U.S. standard IS-54B;

FIG. 8($b$) is an exemplary filter characteristics of a receiver;

FIG. 8($c$) is a graph showing the adjacent channel interference for the examples of FIGS. 8($a$) and 8($b$);

DETAILED DESCRIPTION

Figure 2A:
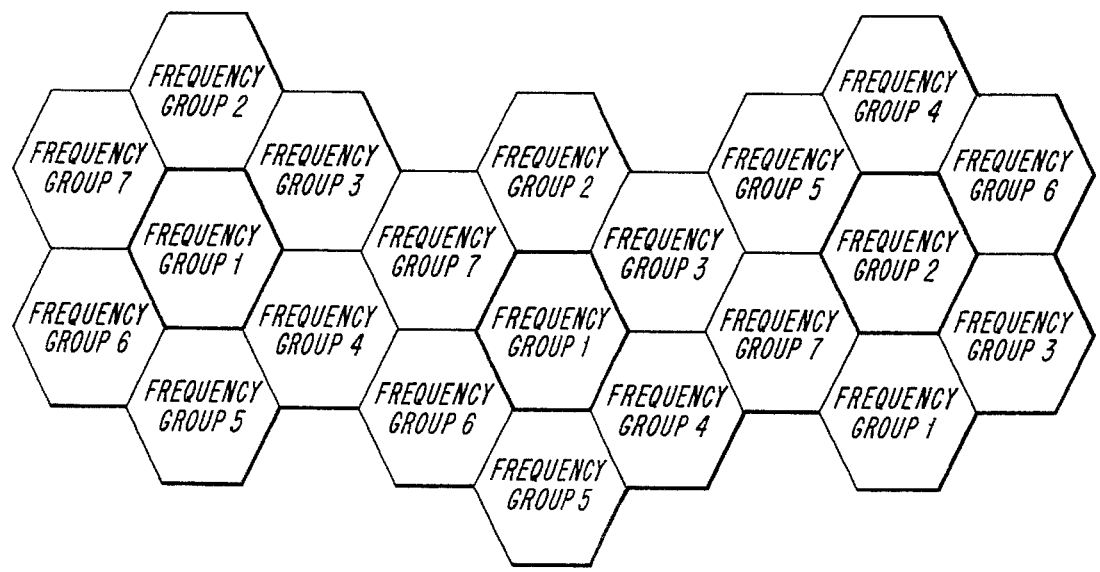
FIG. 2a is an exemplary illustration of a frequency reuse pattern as employed in a fixed plan cellular system.
Figure 2B:
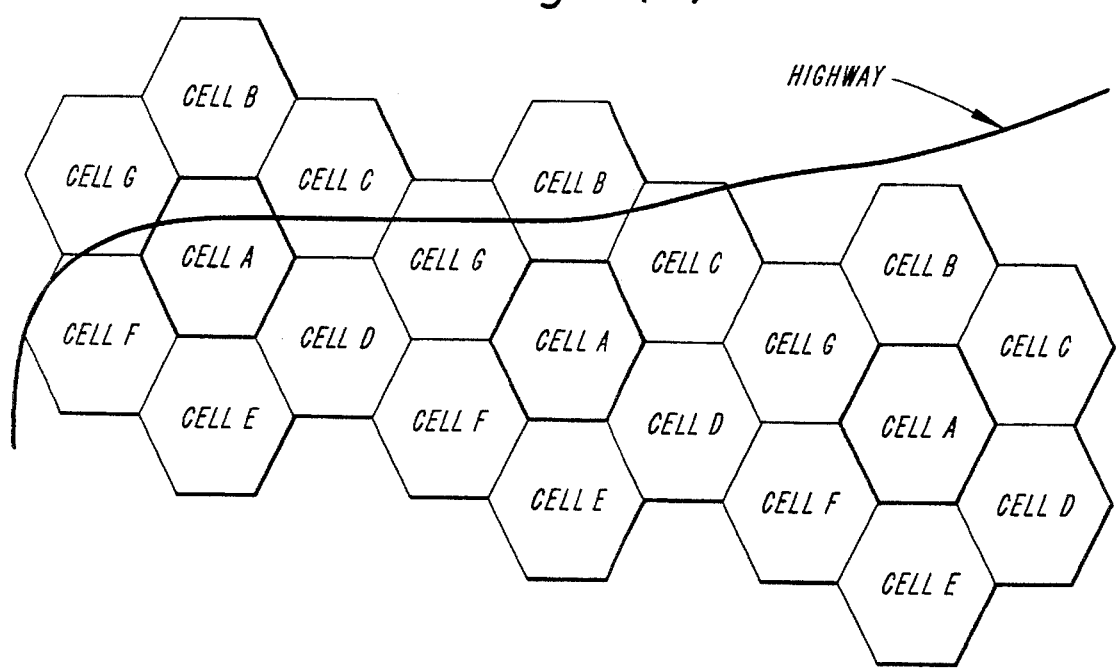
FIG. 2b is an exemplary illustration of the time dependent characteristics of cellular system loading which illustrates the need for an adaptive channel allocation according to the present invention.

In the following description, for purposes of explanation and not limitation, specific details are set forth, such as particular circuits, circuit components, techniques, etc. in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The implementation of the present invention will vary depending on the particular requirements of the communications system to which it is applied. In frequency duplex systems (e.g., AMPS, IS-54B), for example, the uplink and downlink channels are paired, separated by a fixed 45 Mhz offset. The assignment of a downlink channel thereby automatically fixes the uplink channel and vice versa. However, a more general case occurs when the downlink and the uplink can be independently allocated.

An exemplary embodiment of the present invention will therefore first be presented for the case in which the uplink and downlink channels can be selected independently, and for which the transmit power can be independently controlled on any channel. Later, other exemplary embodiments will be described for systems where: the uplink and downlink channels occur in pairs, for systems with limited measuring capabilities in the mobile, and for systems where the APC in the downlink operates on a group of channels as is the case in the current TDMA system defined by IS-54B standard. As will be discussed, each of the embodiments will be influenced, in some degree, by the operating status of the mobile station.

In most cases, the mobile station operates in one of three possible modes. The first to be considered occurs when the mobile station is in active communication (i.e., a call is in progress) and where the mobile station maintains active knowledge of the radio environment. The second mode to be considered is the stand-by mode. When in stand-by mode, the mobile station is listening for pages by periodically scanning the available control channels and therefore has some limited knowledge of the radio environment. Last to be considered is the power on mode. In this mode the mobile station has been completely deactivated and has no a priori knowledge of its environment when first turned-on.

The channel allocation scheme described by this invention makes use of periodic measurements performed both by one or more base stations and/or by one or more mobile stations to determine the best channel under the current radio environment. Note that the term mobile station is used herein to refer to any remote station, for example vehicular radiotelephones and hand-held radiotelephones. In the following description, it is assumed that each base station transmits a pilot signal (i.e., a set-up or control channel) at a known frequency and of a known power level.

Figure 4:
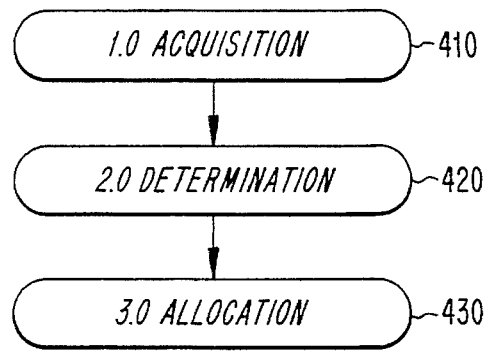
FIG. 4 is a flow chart illustrating the basic operation of an exemplary embodiment of the present invention.

As will be described in greater detail, the allocation process according to this exemplary embodiment of the present invention can be divided into three general phases. As shown in FIG. 4, these are: 1) acquisition 410 of measurement data reflecting the current conditions of the local environment; 2) determination 420 of the most appropriate channel consistent with the measurements made during acquisition; and 3) channel allocation 430 according to predetermined criteria.

The acquisition phase 410 begins with measurements of the signal power of the pilot signals broadcast from surrounding base stations. These measurements are performed by the mobile station which, through a procedure to be described in greater detail, periodically measures the received signal strength (RSSI) of a number of individual pilot signals transmitted from surrounding base stations.

The RSSI of a signal can be measured, for example, as described in U.S. Pat. No. 5,048,059 to Paul W. Dent entitled "Log-Polar Signal Processing", which is incorporated here by reference. The RSSI of a channel is, for this example, simply a measure of the amount of signal power contained within a 30 Khz bandwidth centered at a particular frequency. In addition to signals intentionally broadcast on the channel, the signal power may include co-channel signal power, spillover from adjacent channels, noise, and any other power which exists in the band. In determining the RSSI of each individual downlink signal, the mobile station averages a plurality of individual RSSI measurements (e.g., over 1 second) to smooth out fast fading phenomena. For example, a vehicle equipped with a mobile radio operating at 869 MHz and traveling at 40 MPH should ideally perform RSSI measurements at approximately 7 millisecond intervals to have those measurements uncorrelated to Rayleigh fading. As a typical radio receiver can tune to a specific frequency, perform an RSSI measurement and return to within a few hundred Hz of its initial frequency on the order of 3 milliseconds, such a requirement is not difficult to achieve. To accommodate varying speeds and frequencies, many such measurements are performed and then averaged.

Figure 3:
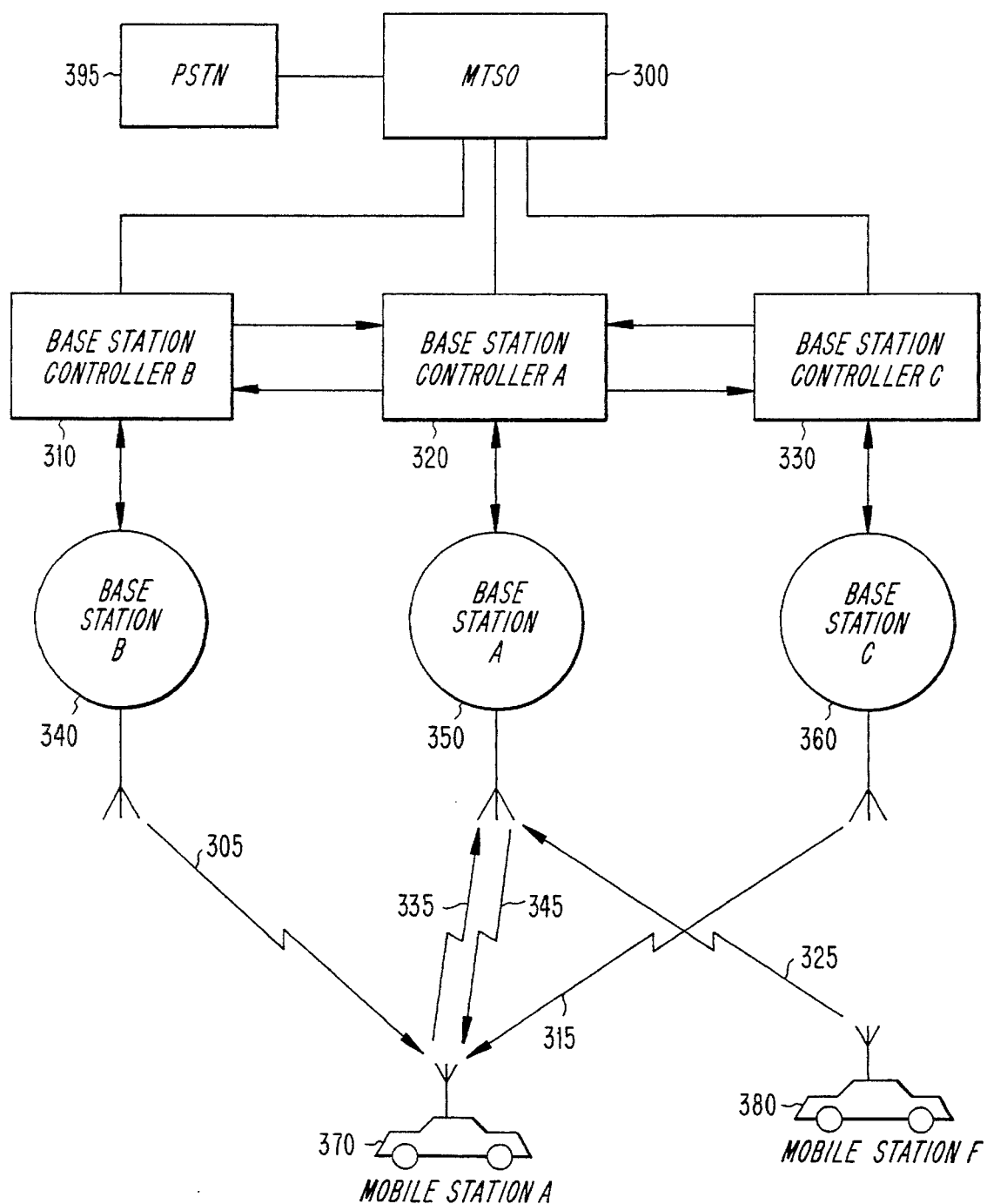
FIG. 3 is an illustration of uplink and downlink interference.

The acquisition procedure will be described with regard to the typical example of a mobile radio communication arrangement illustrated in FIG. 3. It will be appreciated by those skilled in the art that a typical system can, and most likely will, include many more base stations and many more mobile stations than shown in this exemplary illustration. However, to avoid obfuscating the present invention, the two mobile, three base station arrangement of FIG. 3 is presented.

The acquisition operation, indeed operation of the entire network, is controlled via the mobile telephone switching office (MTSO) 300. The MTSO 300 is connected, either directly or indirectly, to each base station controller 310, 320, and 330. This description will first consider the acquisition procedure when a call is presently in progress. In this example, mobile station A (numbered 370) is currently connected to base station A (numbered 350).

As well-described in the IS-54B specification, when a call is in progress, the base station may issue instructions to a mobile station via the FACCH. The FACCH, or fast associated control channel, is a "blank and burst" data transmission protocol whereby messages may be sent over the voice channel. Included in the list of FACCH messages is the "Channel Scan Message". This instruction prompts the mobile station to perform a series of RSSI measurements on a list of frequencies included with the message. Often, this list includes the control channel frequencies broadcast from surrounding base stations. For specific details of FACCH signaling and the Channel Scan Message, the interested reader is referred to the IS-54B document. Note that this particular method of controlling the mobile station is presented for the purposes of illustration only. It will be appreciated by those skilled in the art that other signaling methods and formats could also be used in the execution of the present invention.

In response to instructions generated by the MTSO 300, mobile station A monitors the signals transmitted by surrounding base stations, including that to which it is currently connected. With regard to the situation illustrated in FIG. 3, mobile station A is located so that it receives signals not only from the base station to which it is connected (i.e., signal 345 transmitted from base station A) but from several other surrounding base stations: signal 305 transmitted from base station B (numbered 340), and signal 315 transmitted from base station C (numbered 360). According to the present invention, mobile station A periodically receives a channel scan message broadcast from base station A. This message includes instructions to scan the pilot signals from base stations located in the vicinity of base station A. Note that the actual base station location and/or identification need not be transmitted to the mobile station; the base stations need only be identified by the frequency of the pilot signal broadcast therefrom.

After making RSSI measurements (as described above) of the three downlink signals 305, 315, and 345, mobile station A reports these results to base station controller A (numbered 320), via the slow associated control channel (SACCH) of an uplink traffic channel 335. As with the FACCH, the SACCH is a signaling format specified by IS-54B.

The aforementioned RSSI measurements can now be used to calculate the path losses between the base stations whose signals were measured and the mobile station performing the measurements. The RSSI measurement together with the base transmit power (which is either fixed, or otherwise known by the network 300 and reported to the base station controller of base station A) provide all the information required to calculate the signal path loss (PL) for each signal. Path loss, calculated as the RSSI divided by the base transmit power, is an expression of the attenuation that a signal will experience as it propagates between the base station and the mobile station. For example, assume that mobile station A has measured the RSSI of signal 315 broadcast from base station C to be −125 dBm. It is also known that signal 315 is broadcast at a power level of 0 dBm. Therefore, the calculation of path loss is straightforward:

| | | |
|---|---|---|
| Known Transmit Power of Base Station C | = | 0 dBm |
| Measured RSSI of Base Station C by mobile station | = | −125 dBm |
| Path Loss between mobile station A and base station C | = | 125 dB |

In general, the path loss between a base station of arbitrary index J and the mobile station performing the measurement will be represented by PL(J). Since the pilot RSSI measurements are assumed to be uncorrelated to Rayleigh fading, the path loss from the base to the mobile can, by the principle of reciprocity, be assumed to be identical to the path loss from the mobile station to the base. PL(J) therefore represents the link path loss irrespective of link direction (i.e., uplink or downlink). Thus calculation of the path losses between the mobile station and surrounding base stations completes the first stage of the acquisition process.

The second acquisition stage involves the measurement of RSSI on idle traffic channels (i.e., the potential voice channels which may be allocated) to obtain an estimate of the interference levels. If no restrictions are set on the selection of channels, and if the mobile station and the base station have the same scanning capabilities, the process according to the present invention operates independently for the uplink and the downlink channels. First, the uplink routine is described.

Under instructions from the MTSO 300, base station A continuously monitors the interference levels on its idle traffic channels (i.e., voice channels not in use). The base station scans through all the idle channels, takes RSSI measurement samples and, as before, averages the samples (e.g., over a period of 10 seconds) to make the samples uncorrelated to Rayleigh fading. Note that as with the pilot signal measurements, these RSSI measurements include any interfering power that falls within the measuring bandwidth—irrespective of where the interference comes from. The energy can come from, for example: noise (which is ubiquitous), co-channel users, the spill-over of users on adjacent channels, intermodulation products that happen to fall into the measuring bandwidth, and from non-cellular emissions (both licensed and unlicensed.) With regard to FIG. 3, this process is repeated (either sequentially or simultaneously) by base station B and base station C.

The average uplink interference level on channel K at base J is represented by $I_{UP}(J,K)$. The $I_{UP}$ values of all idle channels, K, at base J are now sent via the base station controller of base station J to the base station controller of the base station to which the considered mobile station is currently connected. For the example shown in FIG. 4, this means that the values measured on idle channels by base stations A, B and C (i.e., $I_{UP}(A,K)$, $I_{UP}(B,K)$, and $I_{UP}(C,K)$, respectively) are sent to base station controller 320 of base A. Index K, of course, represents the voice channels and can, in this example, be any number from 1 to 395.

During the acquisition process, the path loss information calculated from the pilot signal measurements sent by the mobile station and the interference information sent by the surrounding base stations provide the base station controller with the information necessary to calculate all the power levels required on all of the channels that can be allocated. The acquisition phase 410 is then completed and the next step is the determination of the best channel to allocate.

The determination phase 420 includes finding the base station, J, and channel, K, combination that requires the least amount of mobile station transmit power in order to maintain satisfactory quality on the link. For each base station, J, and channel, K, the required mobile station transmit power $P_{MS,req}(J,K)$ can be calculated as:

$$P_{MS,req}(J,K) = (C/I)_0 + PL(J) + I_{UP}(J,K) \, dB \quad (1)$$

As previously described, all the information required to solve equation (1) now resides in base station controller 320. $(C/I)_0$ is the target C/I value that the system tries to maintain on a link and can be defined by the network operator. For example, if it is assumed that the path loss between the mobile station in question and a base station J, PL(J), is calculated as before to be 125 dB and the uplink interference on channel K at base station J is −150 dBm, and the desired C/I is 25 dB, then the required transmit power can be calculated to be:

$$P_{MS,req}(J,K) = 25 \, dB + 125 \, dB - 150 \, dBm = 0 \, dBm \; (1.0 \, m \, \text{Watts})$$

If the desired object is to minimize the transmit power of the mobile station then that channel K on base J with the lowest $P_{MS,req}$ is chosen as the best base and channel combination. Notice that, since the exemplary process according the present invention takes interference into account, this process does not necessarily choose the strongest base (i.e., geographically closest to the mobile, or lowest path loss) as the one with which to establish a link. If the interference level of an available voice channel on a more distant (i.e., in this context correlating to higher path loss) base is significantly lower than the interference levels on any of the idle channels of a closer base station, the required $P_{MS}$ to connect to the more distant base might actually be lower.

For example, assume the path loss, PL, on downlink 345 from base A to mobile station A is 80 dB and the path loss on downlink 305 from base B to mobile station A is 90 dB. Assume further that the lowest interference measured at base A is on channel 32 (825.96 MHz) at a level of −100 dBm. Assume also that the lowest interference level measured at base B occurs on channel 245 (832.35 MHz) at a level of −120 dBm. If the target $(C/I)_0$ is 25 dB, then the minimum required $P_{MS}$ for a link to base A on channel 32 is calculated according to equation (1) to be:

$$P_{MS,req}(A,32) = 25 \, dB + 80 \, dB - 100 \, dBm = +5 \, dBm$$

For a link to base B on channel 245 the minimum required transmit power would be:

$P_{MS,req}(B,245) = 25\ dB + 90\ dB - 120\ dBm = -5\ dBm$

If both base stations transmit at the same power level the downlink signal received at the mobile station from base B is weaker (i.e., higher path loss and ostensibly further away). Assuming reciprocity, the signal received at base station B from the mobile station would be weaker than that received at base station A. However, because of the consideration of interference, even with an additional 10 dB of path loss, less transmit power is required by the mobile station to set up a satisfactory link to base station B. Therefore, for the uplink, the mobile station would be handed-off to channel 245 on base station B. This stands in marked contrast to the earlier-described systems in which the mobile station is handed-off to the base station with the strongest signal.

In addition to the power levels required on potential channels, the base station controller is provided with the prevailing transmit power on the current traffic channel. The mobile can, for example, send this information over the SACCH to the base to which it is connected. This information can then be directed to the base station controller of base station A.

If the best channel and base station combination is not identical to the current channel and base station combination, a re-allocation is considered. However, in order to avoid channel hopping and Ping-Pong effects (the mobile station being repeatedly re-allocated between channels A and B), a hysteresis is built in. The new channel is only allocated if the required transmit power on the new channel is at least x dB smaller than the transmit power on the current channel. The hysteresis value, x, is called the hand-over margin and can be chosen freely. According to exemplary embodiments, x typically lies somewhere in the range of 3 to 6 dB. If the difference between new and current power levels is smaller than the hand-over margin, no re-allocation is made, and the current link is maintained.

The above discussion considers the allocation decision in which a call is already in progress and during which MAHO, or mobile assisted hand over, measurements are sent over the SACCH (or FACCH) of the current traffic channel. In case of a call setup, no traffic channel has been allocated, and the MAHO measurements are sent over the control/calling channel of the base station to which the mobile station is locked on. This is because even if a mobile is in stand-by (i.e., sleep mode) it still keeps track of the surrounding bases during brief periods of wakeup when it performs measurements of pilot signal strength and listens for pages. From this information, the preferred channel and base combination can be determined as described above, and the required transmit power on this new channel is calculated. However, since no current link exists, there is no current transmit power to which a comparison can be made; that is, there is no hand-over margin. Instead the $P_{MS,req}$ on the new channel is compared with the power control range (set by the minimum and maximum power the mobile station can transmit) or with a set-up threshold as being the maximum transmit power allowed at set-up. If the $P_{MS,req}$ of the best channel is below the predetermined maximum transmit power allowed, this channel can be allocated right away. If not, the call must be blocked. The set-up threshold, which may be lower than the maximum available output power, will prevent users that need a lot of power (and would therefore produce a high level of interference) from entering the system at the expense of users who would require lower transmit powers.

In the third operational mode (i.e., power on) no MAHO measurement data is available at all. At power on, the mobile station first scans through all the calling/control channels of the base stations and locks on to the strongest. The corresponding base will then download the channel numbers of the surrounding bases to be measured into the mobile station. From here on, the procedure is as described above. A flowchart summarizing the uplink channel allocation procedure for all three operational modes is shown in FIG. 5.

Figure 5:
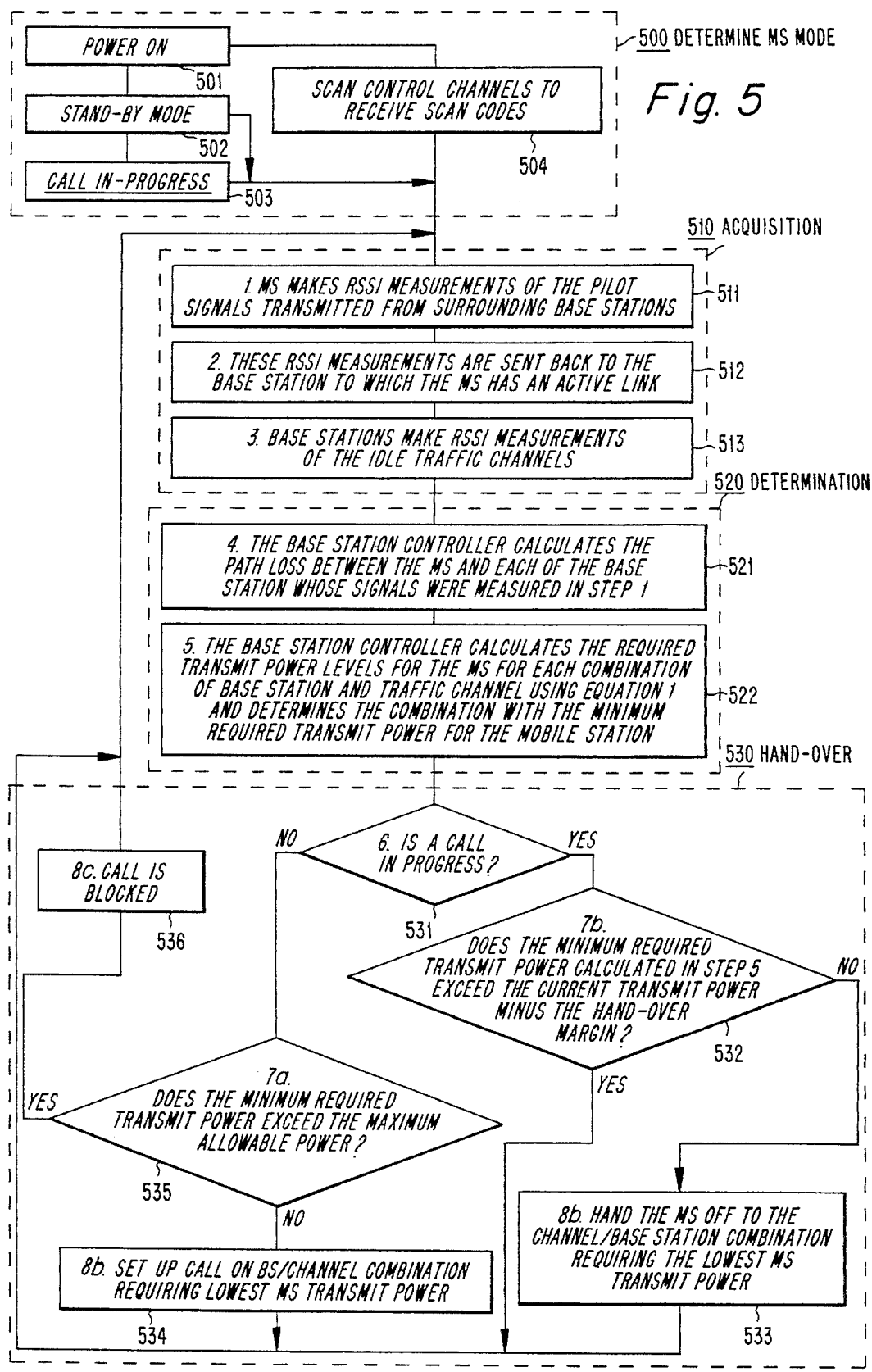
FIG. 5 is a flowchart illustrating the uplink allocation according to an exemplary embodiment of the present invention.

In FIG. 5, superblock 500 indicates a first general step of determining in which of three modes a mobile station is currently operating. If the mobile station is operating in the power on mode at block 501, the flow proceeds to block 504 where the mobile station scans the control channels to receive scan codes. Otherwise, the mobile station is operating in the standby mode 502 or the call in progress mode 503, and the flow proceeds to the acquisition phase at 510. The acquisition phase 510 begins with the step of having the mobile station make RSSI measurements of pilot signals transmitted from surrounding base stations at 511. Next, these RSSI measurements are sent back to the base station to which the mobile station has an active link at block 512. At block 513, the base stations make their own RSSI measurements of the idle traffic channels. The following steps relate to determining which of the channels should be assigned for this link with the mobile station at 520. Thus, the flow proceeds to block 521 wherein the base station controller calculates a path loss between the mobile station and each of the base stations whose signals were measured at block 511. The base station controller then calculates the required transmit power levels for the mobile station for each combination of base station and traffic channel using, for example, equation (1) and determines the combination which gives the minimum required transmit power for the mobile station at block 522.

Having determined which channel should be allocated for this link with the mobile station, the flow then proceeds to the handover phase indicated by superblock 530. At decision block 531, it is determined whether or not the mobile station currently has a call in progress. If so, the flow moves then to block 532 where it is then determined whether or not the minimum required transmit power calculated in block 522 exceeds a current transmit power minus the handover margin. If the answer to this determination is no, then the flow proceeds to block 533 where the handoff to the determined channel/base station occurs. Otherwise, the flow loops back to the beginning of the acquisition phase 510 and no handover occurs at this time.

Looking back again at decision block 531, if it is determined, on the other hand, that there is no call in progress, then the flow proceeds to block 535 where it is determined if the minimum required transmit power exceeds a maximum allowable power as discussed above. If not, the process then moves to block 534 where the call is set up on the channel/base station combination determined in block 522. If the minimum required transmit power does exceed the predetermined maximum allowable power, then the call is blocked at 536.

Assuming that the uplink and downlink channels can be independently allocated, the procedure for assigning the downlink is similar to that described above for assigning the uplink. The path loss values are found the same way as before by using the mobile station measurements of the pilot RSSIs. In fact, these can be made directly without the assumption of reciprocity as was necessary with the uplink estimate. However, now interference measurements on the idle channels at the mobile are made. This assumes that the mobile station has the same ability as the base station to scan the full range of voice channels. Since no particular base is involved, the interference levels only depend on the channel number K: $I_{down}(K)$. These measurements are sent back to the base to which the mobile station is connected, and are directed to its base station controller. The required transmit power of base station (J) is calculated as:

$$P_{BS,req}(J,K) = (C/I)_0 = PL(J) + I_{DOWN}(K) \ dB \quad (2)$$

To reduce the number of computations, only those channels K on base station J are considered that are idle and free to be used. Before the actual re-allocation is made, a comparison between the new PBS on the best channel and the average PBS on the current channel can be made. If smaller than the hand-over margin, then no re-allocation should be made. The downlink procedure according to this exemplary embodiment will now be described with reference to FIG. 6.

Figure 6:
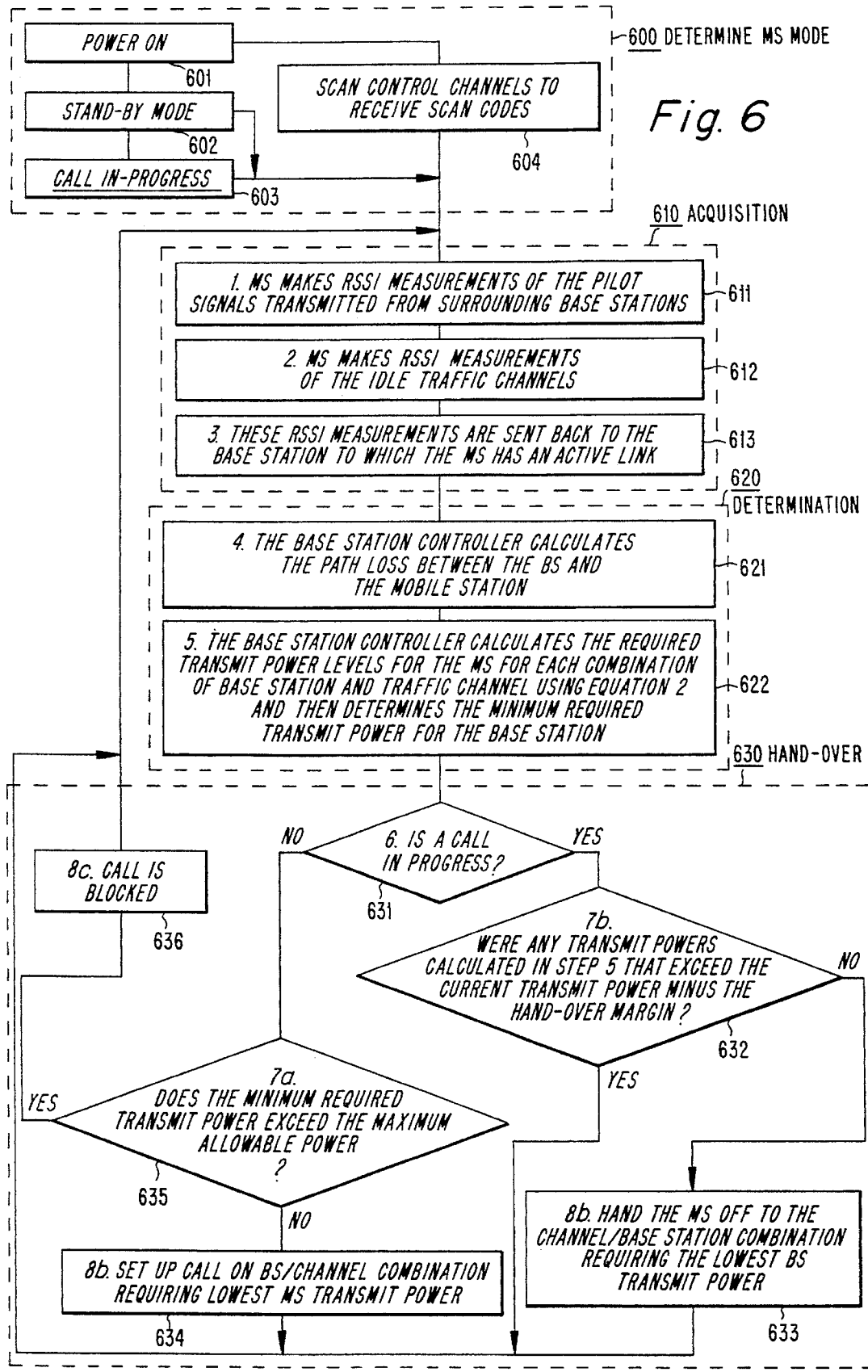
FIG. 6 is a flow chart illustrating the downlink allocation according to an exemplary embodiment of the invention.

In FIG. 6, superblock 600 denotes the step of determining the mobile station's current operating mode. If the mobile station is in the power on mode 601, the flow then proceeds to block 604 where the mobile station scans the detected control channels to receive scan codes. Otherwise, in standby mode 602 or call in progress mode 603, the flow proceeds to block 610 where the acquisition phase occurs. At block 611, the mobile station makes RSSI measurements of the pilot signals transmitted from surrounding base stations. Next, the mobile station at block 612 makes RSSI measurements of the idle traffic channels. These RSSI measurements are sent back to the base station with which the mobile station has an active link at block 613. The determination phase 620 begins with the base station controller calculating a path loss between that base station and the mobile station at block 621. The base station controller then calculates the required transmit power levels for the base station for each combination of base station and traffic channel using equation (2), above, and then determines the minimum required transmit power for the base station at block 622.

Next, during the handover phase 630, there is an initial determination as to whether or not the mobile station has a call in progress at block 631. If the result of this determination is affirmative, the flow moves next to decision block 632 where it is determined whether the transmit power calculated at block 622 exceeds a current transmit power minus a handover margin. If not, then the handoff can be made to the channel base station combination requiring the lowest base station transmit power at block 633. Otherwise, no handoff occurs and the flow loops back to the acquisition phase 610. Looking back again at block 631, if there is no call in progress then it is determined at block 635 whether or not the minimum required transmit power exceeds a predetermined maximum allowable power. If not, then the call can be set up at block 634 on the channel/base station combination which requires the lowest base station power. Otherwise, the call will be blocked at 636 and the flow proceeds back to the acquisition phase 610.

The present invention has been discussed in terms of an exemplary embodiment wherein uplink and downlink channels can be selected independently, and wherein each channel is provided with its own APC. Another exemplary embodiment of the present invention is now presented wherein the uplink and downlink channels are paired in such a manner that there is a fixed offset (e.g., 45 MHz in the IS-54B standard.) In this case, the uplink and downlink information is combined. Instead of selecting the best uplink or downlink channel, one selects the best channel pair which minimizes the transmit power in both the uplink and in the downlink. Thus, a method to minimize the weighted sum of the $P_{MS,req}$ and the $P_{BS,req}$ is given by:

$$\min\{b(P_{MS,req}) + (1-b)(P_{BS,req})\}$$

The parameter b can be chosen with respect to the system conditions and the desires of the operator. For example, if attention is placed on maximizing the mobile station battery life (i.e., minimizing the transmit power of the mobile), greater weight should be placed on minimizing $P_{MS,req}$, so b should approach one. However, if for example, capacity is limited by the downlink (e.g., when the base applies receive diversity with two receive antennas or has other means to reduce its C/I while maintaining satisfactory link quality), most weight should be placed on $P_{BS,req}$, so b should approach zero. It should be noted that if the interference situations in the uplink and downlink are highly correlated, then minimizing the sum comes close to minimizing either $P_{MS}$ or $P_{BS}$ individually. In all other respects, the path loss, PL, and interference measurements, $I_{UP}$, $I_{DOWN}$, which affect $P_{MS}$ or $P_{BS}$ are performed as discussed for the earlier described exemplary embodiment.

Figure 7:
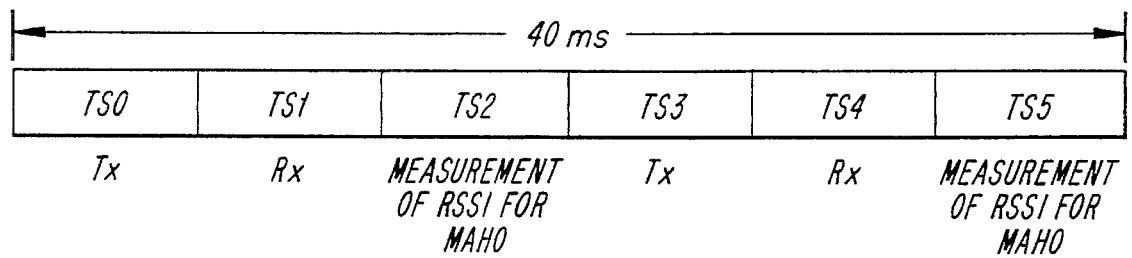
FIG. 7 is an illustration of the IS-54B TDMA frame structure.

In the above, it was assumed that the mobile station had the same capacity as the base station for scanning the range of voice channels. To scan, the mobile locks on a frequency, settles, and then performs a measurement. Clearly for a cellular systems with over 1000 traffic channels, such as the system defined by the IS-54B specification, it is impractical for the mobile to monitor every channel. In addition to the large scanning load in the mobile station, TDMA protocols further exacerbate the scanning problem in that it is impossible to determine the downlink interference on each individual slot. This is a result of the continuous transmission from the base station. As is well-known, a TDMA system divides the 30 kHz wide channels used in AMPS into time slots. IS-54B, for example, divides the channel into three time slots resulting in a three-fold increase in traffic capacity. For reasons beyond the scope of this disclosure, the base station transmits on all three downlink slots even if only one slot is active. Therefore, even if only one time slot is being used, all three time slots on the same carrier carry the same transmit power (with filler information on the idle slots). An illustration of the IS-54B time slot structure is shown in FIG. 7. Note that, although six slots are shown, the current system allocates to each channel two slots per frame (i.e., TS0=TS3, TS1=TS4, TS2=TS5). In order to more clearly describe the function of the invention in a TDMA system, a pedagogic description of the problem of measuring downlink interference in a TDMA system is provided.

With regard to FIG. 7, assume that a base station uses time slot TS0 on carrier 1 to communicate with user A. The slots TS1 and TS2 on carrier 1 are assumed to be idle. Now user B is also close to this base and is interested in startup, or hand-over, of a call on TS1 or TS2 on carrier 1, which, as stated, are both available. The mobile station would therefore like to determine the downlink interference on TS1. In our notation, the downlink interference on base station J, channel K, and time slot, TSx, would be written as $I_{DOWN}(J, K, TSx)$. Therefore the measurement made by the mobile station of the downlink interference emanating from base station A, on channel 1, time slot 1 would be $I_{DOWN}(A, 1, TS1)$ according to this notation. Since base station A does not shutdown its power after TS0, but continues to transmit (with the same power as used in TS0) on TS1 and TS2 as well, user B measures a large RSSI (which would actually be its carrier strength when selecting TS1). This large signal completely overwhelms the interference signal which is likely much weaker than the carrier. In this case a measurement of the downlink interference strength on TS1 is impossible. (Note that the idle power transmitted in TS1 would only be an interference to user B if it would select TS1 on carrier 1 on a different base.) Observe that, in the previous exemplary embodiment, downlink interference measurements were made on idle channels. That is, the mobile station would only measure the RSSI of downlink channels that were currently not being used by the base station to which a link was being considered.

Downlink interference measurements could be avoided altogether if one can rely on a high correlation between uplink and downlink interference conditions. In this case, by choosing the best uplink channel using the method summarized by equation (1), the corresponding downlink channel (offset by 45 MHz) will be acceptable as well. Uplink interference measurements using TDMA are possible because, unlike the base stations, the mobiles transmit on only, for example in IS-54B, one slot of three. Measurements made on unoccupied slots would therefore only include interference. If the correlation is poor, as it most often would be, one must make a prediction of the downlink interference. Therefore, according to another exemplary embodiment of the present invention, a method of predicting the downlink interference levels is included to deal with situations where direct measurement thereof is impossible.

To predict the downlink interference, one should identify the base stations in a wide range around the mobile station that are transmitting on the same channel. The location of these bases and the power levels they are currently using on the considered channel, must be directed to the base station controller doing the ACAPC processing (e.g., in the example of FIG. 3, this is base station controller 320.) This can be accomplished, for example, directly through the MTSO 300. Adjacent channel interference can also be included if it is corrected with the adjacent channel rejection factor.

Figure 8A:
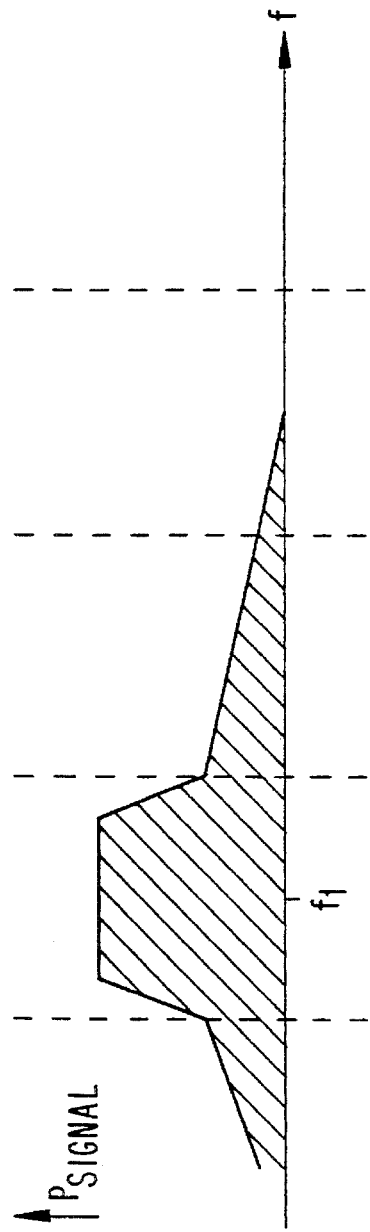
FIG. 8($a$) is a graph illustrating an exemplary power spectrum of a transmitted signal.
Figure 8B:
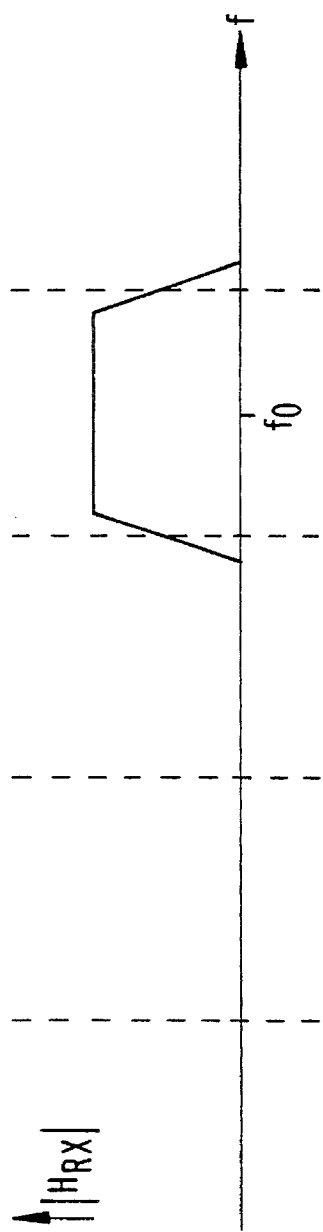
Figure 8C:
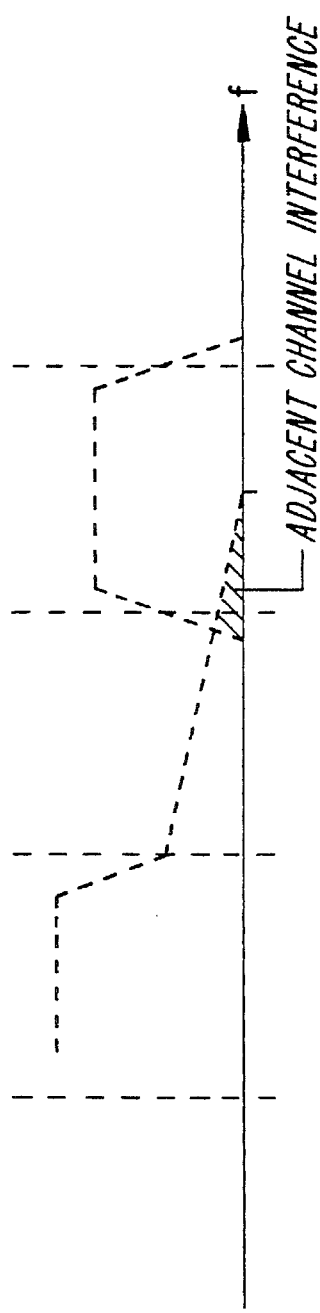

Adjacent channel interference results because of the non-ideal filtering operations in the transmitter and receiver. The power spectrum of a transmitted signal is not zero in adjacent bands, but instead falls off as a function of the frequency offset, see FIG. 8(*a*). On the other hand, the receive filter characteristic is not rectangular, and some power outside of the receive band is taken in as well, see FIG. 8(*b*). The total adjacent channel interference that user A introduces to user B can be seen in FIG. 8(*c*) and is determined by, for example:

(a) the shape of the power spectrum transmitted by user A, e.g., the curve in FIG. 8(*a*);

(b) the absolute value of the power transmitted by user A, e.g., the area under curve of FIG. 8(*a*);

(c) the filter characteristic of user B's receiver, e.g., the curve in FIG. 8(*b*); and (d) the frequency offset between user and interferer.

Items (a) and (c) can be derived from the system specifications (or from the specification of the transmitter and receiver equipment). Item (b) is the transmit power used by A which information can be passed on to the system and item (d) is known as well. The adjacent channel rejection factor can be determined using items (a), (c) and (d). Together with the absolute transmit power of the adjacent interferer, the adjacent channel interference can then be determined. If the spectral shape indicated in item (a) and the filter characteristic, item (c), are not exactly known, at least there exist system specifications which give worst case conditions for allowable spectral shape and filter response. Using this information, the worst-case adjacent channel interference can be calculated.

Unlike the previous situation where path loss could be calculated from pilot signal dam, the path loss from each of these bases to the mobile station is predicted. Because of the frequency plan adopted for the control channels, only the nearest (i.e., the closest 21) base stations can be measured. For these nearby bases which are included in the measurement list, the path losses can accurately be determined, as previously discussed from information contained within the base station and measurements made at the mobile station.

The interfering signals are however more likely to come from distantly located base stations. The control channels from these base stations cannot be measured directly since their signals are overpowered by those base stations in close proximity which have already been measured. Therefore only a crude prediction of the interference emanating from these base stations can be made using known propagation loss models and/or geographical data of the local surroundings which can be located in a database connected to the base station controller. An example of known propagation loss models can be found, for example, in Y. Okumura, et al., "Field Strength and it Variability in UHF and VHF Land-Mobile Radio Service", Review of Elec. Comm. Lab., Vol. 16, September –October 1968, pp. 825–873 and M. Hata, "Empirical Formula for Propagation Loss in Land Mobile Radio Services", IEEE Trans. on Veh. Tech., vol. VT-29, no. 3, August 1980, pp. 317–325. These data can be obtained during installation using transportable test transmitters at proposed base locations, and the use of a specially equipped vehicle to measure RSSI in a local area. Once the transmit powers and the path losses are known, the signal received in the mobile from each base can be calculated. By adding all these power levels together, a prediction of the interference level is obtained. Alternatively, the path losses between all of the base stations can be measured when the system is installed and stored within the network database. These data can be periodically updated as characteristics of the terrain evolve.

Figure 9:
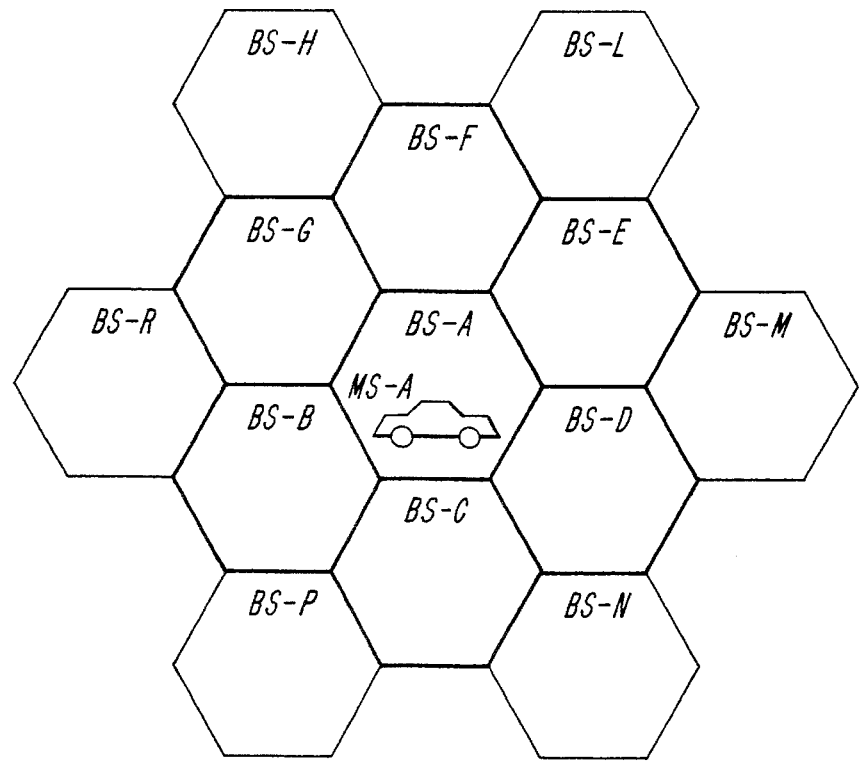
FIG. 9 is an exemplary illustration of the downlink interference prediction.

An example of interference prediction will now be described with respect to FIG. 9. Therein mobile station A is close to base station A and wants to initiate a call over channel K on base station A. The network scans the region around base station A for other base stations that use channel K. It finds three bases L, M, and N. In most cases, these base stations are not normally scanned by a mobile station located near base station A since they are remotely located. The mobile usually scans closely located base stations such as B through G inclusive). It is known that base stations L, M, and N use a transmit power on channel K of 0 dBm, 10 dBm and 15 dBm, respectively. In our notation this is: $P_{TX}(L,K)=0$ dBm, $P_{TX}(M,K)=10$ dBm, and $P_{TX}(N,K)=15$ dBm.

These numbers are sent to the base station controller of base A, together with the location of bases L, M, and N. The network knows, a priori, the distances between base station A and the L, M, and N base stations. In addition, the network may have extra information about the terrain between base station A and the other base stations (e.g., mountains, hills, high buildings). From this information the path loss between base station A and the interfering bases can be determined. Although the location of the mobile station is not exactly known (unless the system contains a locating feature which can determine the location of the mobile within the cell), if the distance is large it can safely be assumed that the path losses from the interfering base stations to the mobile station does not deviate too much from the path losses to base station A.

Alternatively, a so-called beacon may be employed from which these path losses may be directly obtained. From the total number of voice channels available, one channel may be selected for use as a radio beacon. That is, a particular frequency can be chosen to be transmitted sequentially from several distant base stations. To obtain the path losses between any given mobile station and a distant base station the mobile station can be instructed to scan a beacon frequency. Each base station then, in turn, can broadcast information identifying the particular base station and its power level on this frequency. The mobile station can measure the RSSI of this signal and demodulate the identification information according to well-known methods. Determination of the path loss can then be obtained as previously described. Indeed, the mobile station can simply report raw RSSI data back to the base station controller. Since only one base station would broadcast the beacon at a time, the raw RSSI data can be correlated to an individual base station by the network.

Assume that the path losses (predicted or measured) from base stations L, M, and N to the mobile station are 160 dB, 155 dB and 170 dB, respectively. Again using our notation to express the path loss between the mobile station and base station J, we have: PL(L)=160 dB, PL(M)=155 dB, and PL(N)=170 dB. By using the known transmit powers of base stations L, M, and N (i.e., $P_{TX}(L,K)$=0 dBm, $P_{TX}(M,K)$=10 dBm, and $P_{TX}(N,K)$=15 dBm) and the path losses, the predicted RSSIs received in the mobile station are calculated as:

$$I_{DOWN}(J,K)=P_{TX}(J,K)-PL(J)$$

Using this equation with the values selected for this example, the interference from each base station is:

$$I_{DOWN}(L,K)=0\ dBm-160\ dB=-160\ dBm$$

$$I_{DOWN}(M,K)=10\ dBm-155\ dB=-145\ dBm$$

$$I_{DOWN}(N,K)=15\ dBm-170\ dB=-155\ dBm$$

The total predicted interference $I_{DOWN}(K)$ on channel K results from the addition of these values which amounts to approximately −144.5 dBm. Note that the powers must be added since the voltages are uncorrelated. The predicted $I_{DOWN}(K)$ can then be used as described before. In this manner the interferences can be predicted whenever the mobile station, whether due to the signaling format or limited scanning capability, is unable to measure these values directly.

In all of the embodiments presented so far, it was assumed that the APC controlled the power level on each channel individually. Not all systems provide this capability. For example in the IS-54B system, this is only true in the uplink: the mobile station only transmits in its own slot on its own carrier, and can freely adjust its power level. This is not so in the downlink. Because of the absence of guard times in the signaling format, power cannot be ramped up or down between slots. Therefore, all slots sharing the same carrier all use the same power level in the downlink. As we have seen before, this is even true if a slot is idle. Only if all three time slots are idle can the base shutoff the transmit power on that channel. It is also clear that to avoid wasting power (and to reduce overall interference), idle slots on active carriers should be avoided. This means that the allocation scheme should attempt to maximize the number of calls on as few channels as possible. This so-called time slot packing is desirable in IS-54B and can be part of the allocation process wherein priority can first be given to placing calls on those active carriers with idle slots.

An exemplary embodiment of the present invention for a system with downlink transmit power restrictions as described above is now discussed. To distinguish the carrier from its constituent slots (a channel is made up of a carrier frequency and a time slot) we will represent the carrier number by F and the slot number by TS. The APC in the downlink for this exemplary embodiment will be assumed to be limited to variations in carrier power only. If it is assumed that the power is controlled with respect to the user with the lowest C/I, all other users using the same carrier will then have excess quality in the downlink (i.e., a better C/I than is necessary). To minimize transmit power, the allocation process should also organize slots such that those mobile stations needing a similar $P_{BS,req}$ will be placed on the same carrier.

The acquisition phase is the same as before. The path loss values are derived from measurements in the mobile station, and the downlink interference $I_{DOWN}(F)$ is either measured or predicted. Note that in the downlink, the interference levels on all slots sharing a carrier F are the same. In the previously developed notation:ps $$I_{DOWN}(F,TS1)=I_{DOWN}(F,TS2)=I_{DOWN}(F,TS3)=I_{DOWN}(F)$$

Then the required base transmit power $P_{BS,req}(J,F)$ on base J, carrier F can be calculated using equation (2) repeated below with the variable K replaced by F.

$$P_{BS,req}(J,F)=(C/I)_0=PL(J)+I_{DOWN}(F)\ dB \qquad (3)$$

Only those bases, J, are taken into account that are in the measurement list, and only those carriers, F, are taken into account that have at least one idle time slot.

The process for the downlink considers first the carriers which are already active, but have at least one idle slot. These carriers are currently transmitting at a transmit power $P_{BS}$ that is controlled by the user with the lowest C/I. In accordance with this exemplary embodiment of the invention, all carriers which have all slots idle are inactive and are considered at the same time as active carriers with open slots. The carrier which is currently used should also be included; it is marked inactive if only one slot is occupied (i.e., by the user under consideration), or otherwise marked active (then X other users are sharing this carrier) with X slots occupied not including the user under consideration. The ACAPC process subsequently calculates the difference dP between the required power $P_{BS,req}$ and the actual transmit power $P_{BS}$ on the active carriers:

$$dP(J,F)=P_{BS,req}(J,F)-P_{BS}(J,F)$$

From this information three ordered lists are generated: one for channels with one slot open, one for channels with two slots open and one for inactive carriers. For each list the process sorts the dP values from strongest to weakest (most positive to most negative). Subsequently the process scans the dP values of each list separately starting with the strongest (most positive) first, until dP becomes negative (i.e., dP<0) for the first time or the last element in the list is reached (when all dP>0.) The $P_{BS,req}$ for each of the three lists corresponding to the first negative dP value, or to the smallest positive dP value are thereby obtained. The corresponding carriers are optimal in the sense that their current transmit powers are just sufficient (largest dP<0) or require the least amount of increase (smallest dP>0) to satisfy the C/I requirements of the user under consideration. The $P_{BS,req}$ values of the three lists are identified as $P_{BS,req}(2)$, $P_{BS,req}(1)$, $P_{BS,req}(0)$ for channels with one slot open, two slots open, or all three slots open respectively. Notice that the nomenclature refers to the number of occupied, rather than open, slots. These three values are then compared with regard to the absolute power level and occupancy.

Although, it is generally preferred to allocate a carrier with as many occupied slots as possible, this will not occur if it results in transmitted power levels being near maximum.

To facilitate the decision, hysteresis values are established. Specifically, Hys2,1 is the required difference, in dB, between choosing to allocate the mobile station to a carrier with one slot occupied and a carrier with two slots occupied. Hys1,0 is then, similarly, the required difference, also in dB, between choosing to allocate the mobile station to a carrier with one slot occupied and an inactive carrier (i.e., zero slots occupied) and Hys2,0 is the required difference in dB between choosing to allocate the mobile station to a carrier with two slots occupied and an inactive carrier. The carrier with one slot open is chosen if both of the following inequalities, with Hys2,1 less than Hys2,0 are true:

$$P_{BS,req}(2) < P_{BS,req}(1) + Hys2,1$$

and $$P_{BS,req}(2) < P_{BS,req}(0) + Hys2,0$$

Otherwise, the carrier with two open slots is selected provided that:

$$P_{BS,req}(1) < P_{BS,req}(0) + Hys1,0$$

If the selection criteria has not yet been satisfied, then the inactive carrier with the lowest required transmit power is selected.

As may be gleaned from the above, the greater the hysteresis values, the greater the slot packing. It can also be observed that there is a trade-off between maximizing slot-packing and taking the channels with the lowest required transmit power. According to an exemplary embodiment, Hys2,1 is equal to 3 dB, Hys2,0 is equal to 9 dB, and Hys 1,0 is equal to 6 dB. In other words, to activate an inactive carrier, the required power level must be at least 6 dB lower than that required on an active carrier with two slots idle and at least 9 dB lower than that required on an active carrier with 1 slot idle. Similarly, an active carrier with one slot idle is preferred over an active carrier with two slots idle if the former does not require a power level which is more than 3 dB of that required on the carrier with two slots idle. Note that these values are offered for the purposes of illustration and are not meant to be limitative.

In the downlink, for this exemplary system, the C/I ratios on all slots sharing a common carrier are the same, thus, it is immaterial which slot should be selected if more than one is idle. Therefore a random selection could be made, or the selection can be determined by the uplink characteristics as described next.

Again the base station which is selected is not necessarily that with the lowest path loss (i.e., ostensibly closest) since another base station with a higher path loss (i.e., ostensibly further away) may offer better slot packing possibilities. In the description above, for the purposes of illustration, the number of time slots in the TDMA frame was chosen to be three. Those skilled in the art will observe that the present invention may be easily extended to other TDMA systems using more than three (or less than three) slots. For example, there will be an equivalent number of ordered lists and time slots.

An exemplary embodiment of the ACAPC process for the uplink is as follows. Since the mobile station only transmits in its own time slot and shuts down the transmission in the other slots, the difficulties in determining interference found in the downlink are not experienced in the uplink. In addition, the mobile station itself determines the APC on the uplink. Therefore, the uplink C/I is usually better than that of the downlink, and the performance of the system is limited by the downlink. When the uplink and the downlink can be selected independently, the best uplink can be found by using equation (1) repeated below with $I_{UP}(J,K)$ replaced by $I_{UP}(J,F,TS)$ and selecting that channel base/carrier/slot combination that gives the lowest $P_{MS,req}(J,F,TS)$.

$$P_{MS,req}(J,F,TS) = (C/I)_0 + PL(J) + I_{UP}(J,F,TS) \ dB \quad (4)$$

When the uplink and downlink channels are paired (e.g., with 45 MHz offset), then the uplink should accept the base/carrier combination (J,K) found by the downlink process as described before (since this is the best combination for the downlink which is limiting the performance). If more than one idle time slot is present on this base/carrier combination, the uplink can now be optimized by selecting that time slot that gives the best uplink performance with the lowest $P_{MS,req}(J,F,TS)$. Exemplary embodiments of a mobile unit and a base station in which the foregoing exemplary channel allocation schemes can be implemented will now be described in conjunction with FIGS. 10 and 11, respectively.

Figure 10:
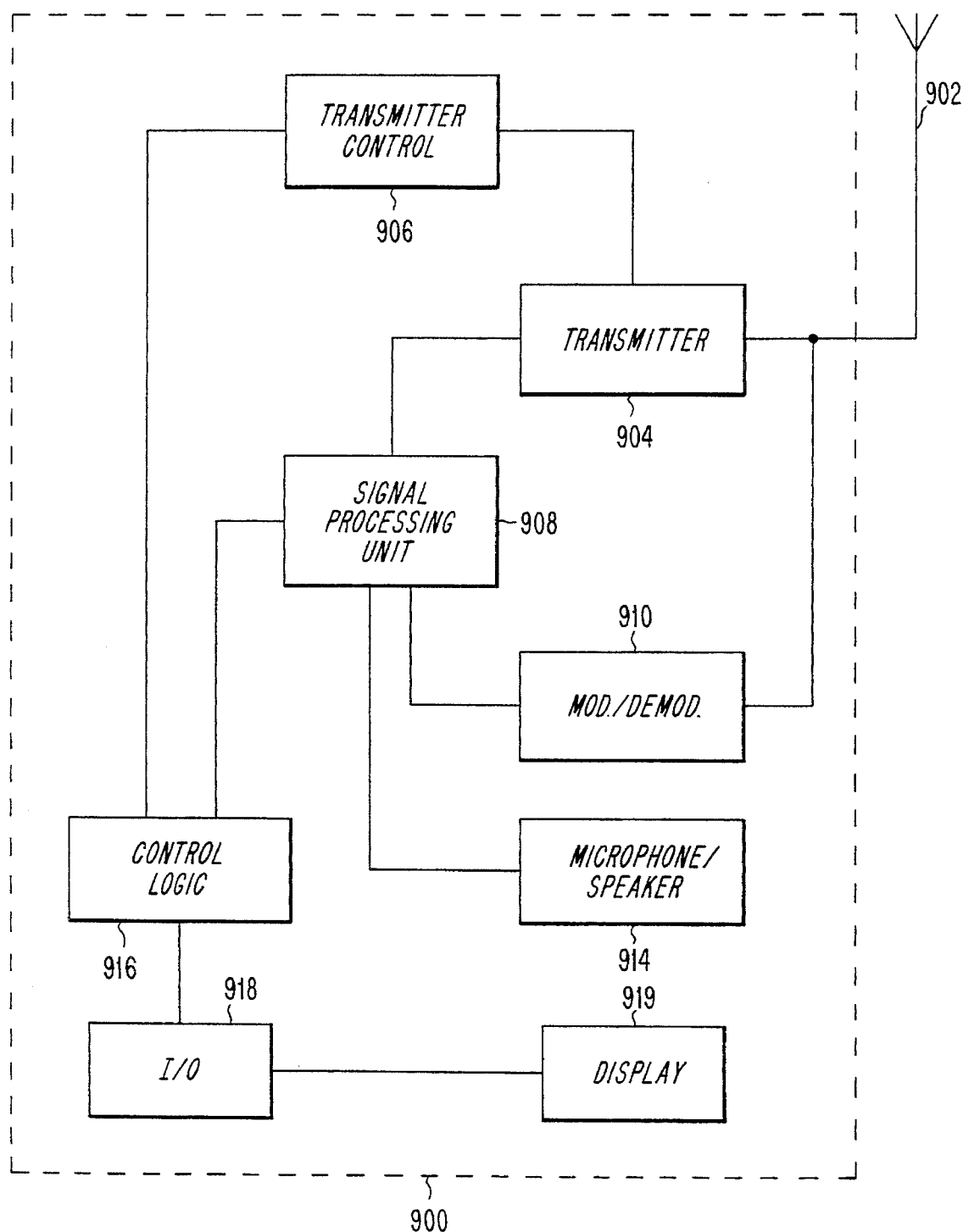
FIG. 10 is a block diagram of an exemplary mobile station according to the present invention.

In FIG. 10, the mobile station 900 has an antenna 902. A transmitter 904 is connected to the antenna 902 and is controlled by a transmitter control unit 906 which, among other functions, is able to effect channel allocation in conjunction with control logic 916. The transmitter is also connected to a signal processing unit 908. A receiver 910 is also connected to the antenna and is used in time multiplex together with the transmitter 904. The receiver 910 is also connected to the signal processing unit 908. Radio equipment for modulating, demodulating and equalizing purposes is included in the blocks 904 and 910. The signal processing unit 908 includes, for example, circuitry for channel coding, channel decoding and signal processing of incoming and outgoing speech. The signal processing unit 908 is also connected to a microphone and speaker in block 914, and to control logic 916. In turn, the control logic 916 is connected to the transmitter control unit 906 and to I/O-block 918 which processes the I/O signals from a keyboard (not shown) and to a display 919.

Figure 11:
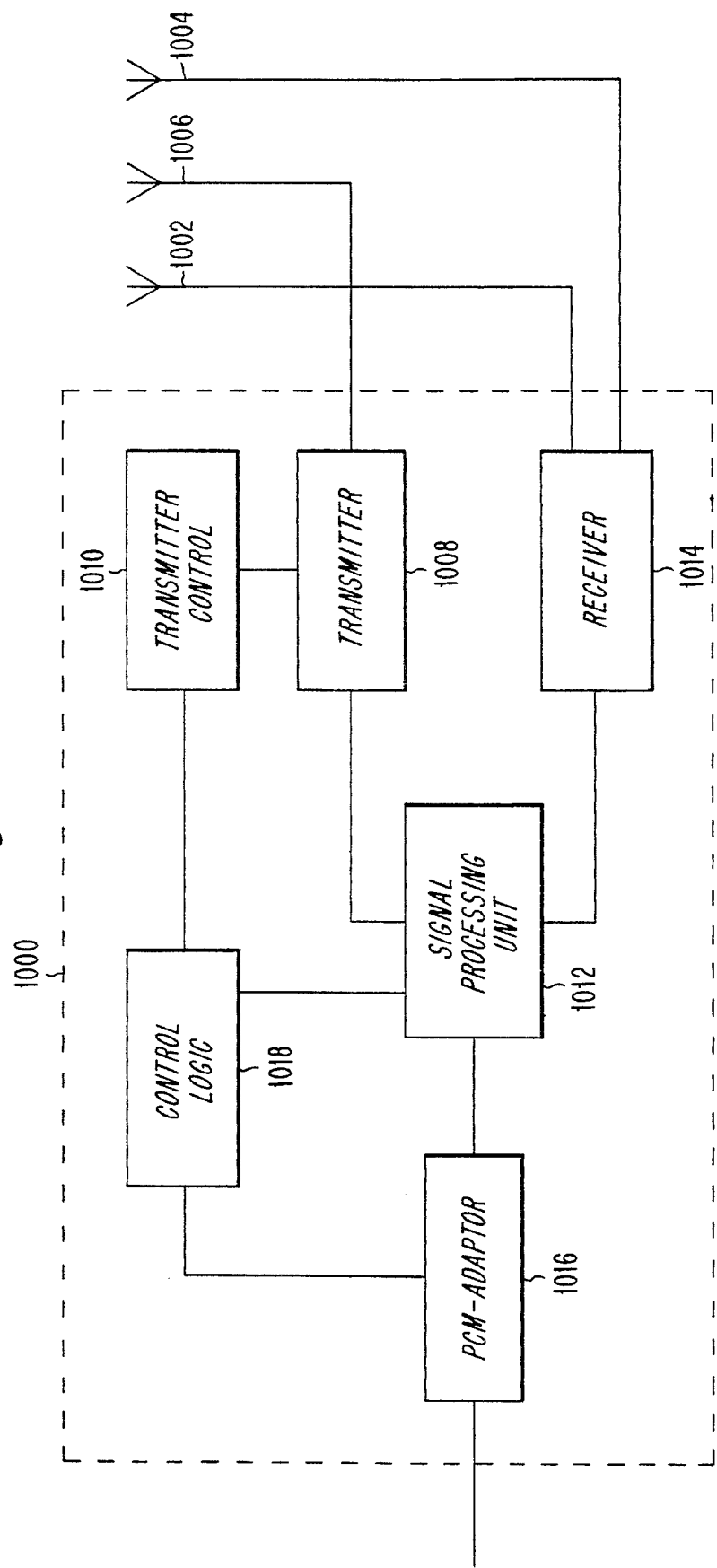
FIG. 11 is a block diagram of an exemplary base station according to the present invention.

FIG. 11 is a block diagram illustrating an exemplary base station. Although the block diagram of FIG. 11, is illustrated as a single system, those skilled in the art will readily appreciate that the hardware shown in FIG. 11 can also be distributed over several units, for instance over a base station and a base station controller.

The base station, generally referred to by reference numeral 1000, has three antennas, of which two, 1002 and 1004, are used for receiving signals, whereas only one antenna 1006, is used to transmit signals. A transmitter 1008 is connected to the antenna 1006 and is controlled by a transmitter control unit 1010. The transmitter 1008 is also connected to the signal processing unit 1012. A receiver 1014 is also connected to the antennas 1002 and 1004 and the signal processing unit 1012. Radio equipment for modulating and demodulating and equalizing purposes is included in the blocks 1008 and 1014. The signal processor unit 1012 provides for channel coding and decoding and processing speech in the incoming and outgoing directions. The signal processor unit 1012 is also connected to the PCM-link adaptor block 1016 and to the control logic 1018. In turn, the control logic 1018 is connected to the transmitter control unit 1010.

Figure 12:
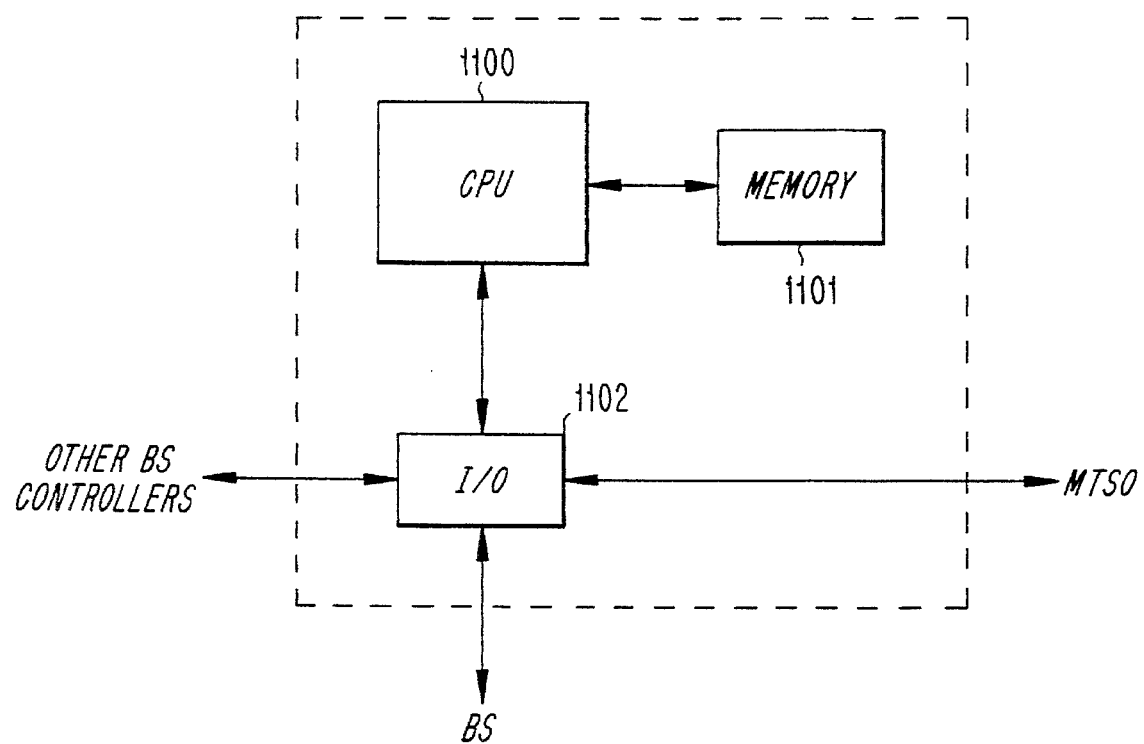
FIG. 12 is a block diagram of a portion of an exemplary base station controller according to the present invention.

FIG. 12 is a block diagram which illustrates a portion of an exemplary base station controller which handles the ACAPC routine according to the present invention. The CPU 1100 will receive the measurement data, perform averaging, make ordered lists and perform the other decisions described above regarding the allocation of channels. The memory 1101, in addition to storing current channel allocation assignments, can contain a database including information regarding the geographical characteristics of the surrounding area which can be used to make predictions. Alternatively, such a database could be located at the MTSO. The I/O unit 1102 can connect this base station controllers to other BSCs, the MTSO and the base station that it controls.

Those skilled in the art will appreciate that the foregoing exemplary mobile and base station descriptions are intended simply to illustrate apparatuses which can be used to implement the channel allocation schemes according to the present invention and that any other type of base station or mobile station can be used. For example, those systems disclosed in U.S. Pat. Nos. 5,230,082 entitled "Method and Apparatus for Enhancing Signaling Reliability in a Cellular Mobile Radio Telephone System" to Ghisler et al. and 5,109,528 entitled "Handover Method for a Mobile Radio System" to Uddenfeldt can also be used and the disclosure of these patents are incorporated here by reference.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

What is claimed is:

1. A method for assigning uplink radio channels in a radio communication system comprising the steps of:

(a) measuring, in a mobile station, received signal strength indications (RSSIs) of control signals broadcast from at least one base station;

(b) determining a path loss between the mobile station and the at least one base station using the RSSI measurements;

(c) measuring, in the at least one base station, an RSSI of interference signals on a plurality of available traffic channels;

(d) determining transmit powers required for the mobile station to produce a signal on each of the plurality of available traffic channels at the at least one base station, wherein a strength of said signal is a predetermined level above a corresponding RSSI interference level measured on a traffic channel taking into consideration the path loss; and (e) assigning one of said plurality of available traffic channels as an uplink channel based on said determined transmit powers.

2. The method of claim 1 wherein said radio communication system includes a plurality of mobile stations and said assigning step further comprises the step of:

assigning, as said uplink channel, said one of said plurality of available traffic channels which will minimize transmit power in said plurality of mobile stations.

3. A method for assigning downlink radio channels in a radio communication system comprising the steps of:

(a) measuring, in a mobile station, received signal strength indications (RSSIs) of control signals broadcast from at least one base station;

(b) determining a path loss between the mobile station and the at least one base station using the RSSI measurements;

(c) measuring, in the mobile station, an RSSI of interference signals on a plurality of available traffic channels;

(d) determining transmit powers required of the at least one base station to produce, at the mobile station, a signal on each of the plurality of available traffic channels having a signal strength which is a predetermined level above a corresponding RSSI interference level measured on a traffic channel taking into consideration the path loss; and (e) assigning one of said plurality of available traffic channels as a downlink channel based on said determined transmit powers.

4. The method of claim 3 wherein said assigning step further comprises the step of:

assigning, as said downlink channel, said one of said plurality of available traffic channels which will minimize transmit power in said at least one base station.

5. In a radio communication system wherein uplink and downlink channels are separated by a predetermined frequency offset, a method for assigning radio channels comprising the steps of:

(a) measuring, in a mobile station, received signal strength indications (RSSIs) of control signals broadcast from at least one base station;

(b) determining a path loss between the mobile station and the at least one base station using the RSSI measurements;

(c) measuring, in the at least one base station, first RSSIs of interference signals on a plurality of available traffic channels;

(d) determining transmit powers required for the mobile station to produce a signal on each of the plurality of available traffic channels at the at least one base station, wherein a strength of said produced signal is a predetermined level above a corresponding first RSSI interference level measured on a traffic channel, taking into consideration the path loss;

(e) measuring, in the mobile station, second RSSIs of interference signals on each of said plurality of available traffic channels;

(f) determining transmit powers required of the at least one base station to produce, at the mobile station, a signal on each of the plurality of available traffic channels having a signal strength which is a predetermined level above a corresponding second RSSI interference level measured on a traffic channel, taking into consideration the path loss; and (g) assigning a radio channel based on at least one of said determined transmit powers required of the mobile station and said determined transmit powers required of the at least one base station.

6. The method of claim 5 wherein said assigning step further comprises the step of:

assigning said radio channel which will minimize a weighted sum of said determined transmit powers required of the mobile station and said determined transmit powers required of the at least one base station.

7. The method of claim 5 wherein said assigning step further comprises the step of:

assigning said radio channel which will minimize uplink transmit power.

8. The method of claim 5 wherein said assigning step further comprises the step of:

assigning said radio channel which will minimize downlink transmit power.

9. A method for assigning downlink radio channels in a radio communication system comprising the steps of:

(a) measuring, in a mobile station, received signal strength indications (RSSIs) of control signals broadcast from at least one base station;

(b) determining a path loss between the mobile station and the at least one base station using the RSSI measurements;

(c) predicting RSSIs of interference signals emanating from said at least one base station on each of a plurality of available traffic channels;

(d) determining transmit powers required of the at least one base station to produce, at the mobile station, a signal on each of the plurality of available traffic channels having a signal strength which is a predetermined levels above a corresponding RSSI interference level measured on that traffic channel, taking into consideration the path loss; and (e) assigning a channel based on said determined transmit powers.

10. The method of claim 9 wherein said assigning step further comprises the step of:

assigning said channel which will minimize transmit power.

11. A method for assigning downlink radio channels in a radio communication system comprising the steps of:

(a) measuring, in a mobile station, first received signal strength indications (RSSIs) of control signals broadcast from a first base station;

(b) determining a first path loss value between the mobile station and the first base station using the first RSSI measurements;

(c) measuring second RSSIs of a beacon signal broadcast from a second base station;

(d) determining a second path loss value between the mobile station performing the second RSSI measurements and the second base station broadcasting the beacon signal using the second RSSI measurements;

(e) estimating interference levels on each of a plurality of traffic channels using the first and second path loss values;

(f) determining transmit powers required for the first base station to produce, at the mobile station, a signal on each of the plurality of available traffic channels whose strength is a predetermined level above an interference level estimated on that traffic channel taking into consideration the first and second path loss values; and (g) assigning a channel based on said determined transmit powers.

12. The method of claim 11 wherein said assigning step further comprises the step of:

assigning as said channel a channel which will minimize transmit power.

13. A method for assigning downlink radio channels in a time division multiple access (TDMA) radio communication system comprising the steps of:

(a) measuring, in a mobile station, received signal strength indications (RSSIs) of control signals broadcast from a first base station;

(b) determining a path loss between the mobile station and the first base station using the RSSI measurements;

(c) predicting RSSIs of interference signals emanating from a second base station on a plurality of available traffic channels;

(d) determining a transmit power, on each carrier having one slot open, needed for each base station to produce, at the mobile station, a signal on the plurality of available traffic channels having a signal strength which is a predetermined level above a corresponding interference level measured on that traffic channel;

(e) determining a transmit power, on each carrier having two slots open, needed for each base station to produce, at the mobile station, a signal on the plurality of available traffic channels having a signal strength which is a predetermined level above the interference level measured on that traffic channel;

(f) determining a transmit power, on each idle carrier, needed for each base station to produce, at the mobile station, a signal on the plurality of available traffic channels having a strength which is a predetermined level above a corresponding interference level measured on that traffic channel; and (g) assigning a channel based on said determined transmit powers.

14. The method of claim 13 wherein said assigning step further comprise the following steps:

(a) arranging into lists ordered based on increasing transmit powers, the transmit powers on those carriers with one slot open, the transmit powers on those carriers with two slots open and the transmit powers on idle carriers;

(b) comparing said lists with a current transmitted power level of the first base station to find a carrier with one slot open which requires less power than said current transmitted power level.

(c) comparing said lists with the current transmitted power level of the first base station to find a carrier with two slots open which requires less power than said current transmit power level.

(d) comparing said lists with the current transmitted power level of the first base station to find an idle carrier which requires the least amount of transmitted power;

(e) selecting said carrier with one slot open which requires less power than said carrier with two slots open plus a first predetermined level and less power than said idle carrier plus a second predetermined level.

15. The method of claim 14 wherein said step of selecting further comprises the step of:

assigning said first predetermined level a value which is less than that of said second predetermined level.

16. The method of claim 13 wherein said step of assigning further comprises the following steps:

(a) arranging into lists ordered based on increasing transmit power the transmit powers on those carriers with one slot open, the transmit powers on those carriers with two slots open and the transmit power on the idle carriers;

(b) comparing said lists with a current transmitted power level of the first base station to find a carrier with two slots open which requires less power than said current transmitted power level;

(c) finding an idle carrier which requires the least amount of transmit power; and (d) selecting said carrier with two slots open which requires less power than said first idle channel plus a first predetermined power level.

17. A radiocommunication system comprising:

means, disposed in a mobile station, for measuring received signal strength indications (RSSIs) of control signals broadcast from at least one base station;

means for determining a path loss between the mobile station and the at least one base station using the RSSI measurements;

means, disposed in the at least one base station, for measuring an RSSI of interference signals on a plurality of available traffic channels;

means for determining transmit powers required for the mobile station to produce a signal on each of the plurality of available traffic channels at the at least one base station, wherein a strength of said signal is a predetermined level above a corresponding RSSI interference level measured on an available traffic channel taking into consideration the path loss; and means for assigning one of said plurality of available traffic channels as an uplink channel based on said determined transmit powers and a predetermined criteria.

18. The system of claim 17 wherein said system includes a plurality of mobile stations and said means for assigning further comprises:

means for assigning, as said uplink channel, said one of said plurality of available traffic channels which will minimize transmit power in said plurality of mobile stations.

19. A radiocommunication system comprising:

means, disposed in a mobile station, for measuring received signal strength indications (RSSIs) of control signals broadcast from at least one base station;

means for determining a path loss between the mobile station and the at least one base station using the RSSI measurements;

means, disposed in the mobile station, for measuring an RSSI of interference signals on a plurality of available traffic channels;

means for determining transmit powers required of the at least one base station to produce, at the mobile station, a signal on each of the plurality of available traffic channels having a signal strength which is a predetermined level above a corresponding RSSI interference level measured on the traffic channel taking into consideration the path loss; and means for assigning one of said plurality of available traffic channels as a downlink channel based on said determined transmit powers.

20. The system of claim 19 wherein said means for assigning further comprises:

means for assigning, as said downlink channel, said one of said plurality of available traffic channels which will minimize transmit power in said at least one base station.

21. A radio communication system comprising:

uplink and downlink channels which are separated by a predetermined frequency offset;

means, disposed in a mobile station, for measuring received signal strength indications (RSSIs) of control signals broadcast from at least one base station;

means for determining a path loss between the mobile station and the at least one base station using the RSSI measurements;

means, disposed in the at least one base station, for measuring first RSSIs of interference signals on a plurality of available traffic channels;

means for determining transmit powers required for the mobile station to produce a signal on each of the plurality of available traffic channels at the at least one base station, wherein a strength of said produced signal is a predetermined level above a corresponding first RSSI interference level measured on that traffic channel, taking into consideration the path loss;

means, disposed in the mobile station, for measuring second RSSIs of interference signals on each of said plurality of available traffic channels;

means for determining transmit powers required of the at least one base station to produce, at the mobile station, a signal on each of the plurality of available traffic channels having a signal strength which is a predetermined level above a corresponding second RSSI interference level measured on that traffic channel, taking into consideration the path loss; and means for assigning a radio channel based on at least one of said determined transmit powers required of the mobile station and said determined transmit powers required of the at least one base station.

22. The system of claim 21 wherein said assigning means further comprises:

means for assigning said radio channel which will minimize a weighted sum of said determined transmit powers required of the mobile station and said determined transmit powers required of the at least one base station.

23. The system of claim 21 wherein said assigning means further comprises:

means for assigning said radio channel which will minimize uplink transmit power.

24. The system of claim 21 wherein said assigning step further comprises:

means for assigning said radio channel which will minimize downlink transmit power.

25. A radiocommunication system comprising:

means, disposed in a mobile station, for measuring received signal strength indications (RSSIs) of control signals broadcast from at least one base station;

means for determining a path loss between the mobile station and the at least one using the RSSI measurements;

means for predicting an RSSI of interference signals emanating from said at least one base station on each of a plurality of available traffic channels;

means for determining transmit powers required of the at least one base station to produce, at the mobile station, a signal on each of the plurality of available traffic channels having a signal strength which is a predetermined level above a corresponding RSSI interference level measured on that traffic channel, taking into consideration the path loss; and means for assigning a channel based on said determined transmit powers.

26. The system of claim 25 wherein said means for assigning further comprises:

means for assigning said channel which will minimize transmit power.

27. A radiocommunication system comprising:

means, disposed in a mobile station, for measuring first received signal strength indications (RSSIs) of control signals broadcast from a first base station;

means for determining a first path loss value between the mobile station and the first base station using the first RSSI measurements;

means for measuring a second RSSI of a beacon signal broadcast from a second base station;

means for determining a second path loss value between a mobile station performing the second RSSI measurements and the second base station broadcasting the beacon signal using the second RSSI measurement;

means for estimating interference levels on each of a plurality of traffic channels using the first and second path loss values;

means for determining transmit powers required for the first base station to produce, at the mobile station, a signal on each of the plurality of available traffic channels whose strength is a predetermined level above an interference level estimated on that traffic channel taking into consideration the first and second path loss values; and means for assigning a channel based on said determined transmit powers.

28. The method of claim 27 wherein said means for assigning further comprises:

means for assigning as said channel a channel which will minimize transmit power.

29. A time division multiple access (TDMA) radiocommunication system comprising:

means, disposed in a mobile station, for measuring received signal strength indications (RSSIs) of control signals broadcast from a first base station;

means for determining a path loss between the mobile station and the first base station using the RSSI measurements;

means for predicting RSSIs of interference signals emanating from a second base station on a plurality of available traffic channels;

means for determining a transmit power, on each carrier having one slot open, needed for each base station to produce, at the mobile station, a signal on the plurality of available traffic channels having a signal strength which is a predetermined level above a corresponding interference level measured on that traffic channel;

means for determining a transmit power, on each carrier having two slots open, needed for each base station to produce, at the mobile station, a signal on the plurality of available traffic channels having a signal strength which is a predetermined level above the interference level measured on that traffic channel;

means for determining a transmit power, on each idle carrier, needed for each base station to produce, at the mobile station, a signal on the plurality of available traffic channels having a strength which is a predetermined level above a corresponding interference level measured on that traffic channel; and means for assigning a channel based on said determined transmit powers.

30. The system of claim 29 wherein said means for assigning further comprises:

means for arranging into lists ordered based on increasing transmit powers, the transmit powers on those carriers with one slot open, the transmit powers on those carriers with two slots open and the transmit powers on idle carriers;

means for comparing said lists with a current transmitted power level of the first base station to find a carrier with one slot open which requires less power than said current transmitted power level;

means for comparing said lists with the current transmitted power level of the first base station to find a carrier with two slots open which requires less power than said current transmit power level;

means for comparing said lists with the current transmitted power level of the first base station to find an idle carrier which requires the least amount of transmitted power; and means for selecting said carrier with one slot open which requires less power than said carrier with two slots open plus a first predetermined level and less power than said idle carrier plus a second predetermined level.

31. The system of claim 30 wherein said selecting means further comprises:

means for providing said first predetermined level with a value which is less than a value of said second predetermined level.

32. The method of claim 29 wherein said assigning means further comprises:

means for arranging into lists ordered based on increasing transmit power the transmit powers on those carriers with one slot open, the transmit powers on those carriers with two slots open and the transmit power on the idle carriers;

means for comparing said lists with a current transmitted power level of the first base station to find a carrier with two slots open which requires less power than said current transmitted power level;

means for finding an idle carrier which requires the least amount of transmit power; and means for selecting said carrier with two slots open which requires less power than said first idle channel plus a first predetermined power level.

\* \* \* \* \*